US012670565B2

(12) United States Patent
Shao et al.

(10) Patent No.: US 12,670,565 B2
(45) Date of Patent: Jun. 30, 2026

(54) IMAGE PROCESSING METHOD AND ELECTRONIC DEVICE

(71) Applicant: Honor Device Co., Ltd., Shenzhen (CN)

(72) Inventors: Tao Shao, Shenzhen (CN); Yu Wang, Shenzhen (CN); Bin Xiao, Shenzhen (CN); Congchao Zhu, Shenzhen (CN); Hantao Cui, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 286 days.

(21) Appl. No.: 18/546,924

(22) PCT Filed: Apr. 29, 2022

(86) PCT No.: PCT/CN2022/090658
§ 371 (c)(1),
(2) Date: Aug. 17, 2023

(87) PCT Pub. No.: WO2023/010913
PCT Pub. Date: Feb. 9, 2023

(65) Prior Publication Data
US 2024/0311969 A1 Sep. 19, 2024

(30) Foreign Application Priority Data
Jul. 31, 2021 (CN) .......................... 202110877394.9

(51) Int. Cl.
*G06T 5/94* (2024.01)
*G06T 5/50* (2006.01)
(Continued)

(52) U.S. Cl.
CPC .................. *G06T 5/94* (2024.01); *G06T 5/50* (2013.01); *G06T 5/60* (2024.01); *G06T 7/174* (2017.01);
(Continued)

(58) Field of Classification Search
CPC .... G06T 5/94; G06T 5/50; G06T 5/60; G06T 7/174; G06T 2207/10024;
(Continued)

(56) References Cited

U.S. PATENT DOCUMENTS 6,266,103 B1 7/2001 Barton et al.
2010/0322513 A1* 12/2010 Xu ............................ G06T 5/20
382/167

(Continued)

FOREIGN PATENT DOCUMENTS

CN 105812646 A 7/2016
CN 107590817 A 1/2018
(Continued)

*Primary Examiner* — Phuoc Tran
(74) *Attorney, Agent, or Firm* — Slater Matsil, LLP

(57) ABSTRACT

This application relates to the field of image processing, and provides an image processing method and an electronic device. The electronic device captures a first image—that is an image captured by a camera lens. The first image includes a first shot object and a second shot object. The electronic device determines a first scene corresponding to the first shot object and a second scene corresponding to the second shot object. The electronic device determines a first LUT based on the first scene, and determines a second LUT based on the second scene. The electronic device processes the first image based on the first LUT to obtain a second image, and processes the first image based on the second LUT to obtain a third image. The electronic device displays a fourth image. The fourth image includes a part of the second image and a part of the third image.

20 Claims, 20 Drawing Sheets

(51) Int. Cl.
　　*G06T 5/60*　　　　(2024.01)
　　*G06T 7/174*　　　　(2017.01)

(52) U.S. Cl.
　　CPC ............... *G06T 2207/10024* (2013.01); *G06T 2207/20081* (2013.01); *G06T 2207/20084* (2013.01); *G06T 2207/20208* (2013.01); *G06T 2207/20216* (2013.01)

(58) Field of Classification Search
　　CPC . G06T 2207/20081; G06T 2207/20084; G06T 2207/20208; G06T 2207/20216; H04N 23/617; H04N 23/632; H04M 2250/52; H04M 1/72403
　　See application file for complete search history.

(56)　　　　　　References Cited

U.S. PATENT DOCUMENTS

| | | | | |
|---|---|---|---|---|
| 2012/0242790 | A1* | 9/2012 | Sandrew | H04N 13/257 |
| | | | | 348/43 |
| 2015/0316774 | A1* | 11/2015 | Murphy | H04N 9/7936 |
| | | | | 348/63 |
| 2020/0053293 | A1 | 2/2020 | Lee et al. | |
| 2021/0233248 | A1 | 7/2021 | Li et al. | |
| 2022/0230323 | A1 | 7/2022 | Liba et al. | |
| 2022/0237799 | A1* | 7/2022 | Price | G06T 7/174 |
| 2022/0301180 | A1 | 9/2022 | Wang et al. | |
| 2023/0196524 | A1* | 6/2023 | Kim | H04N 19/117 |
| | | | | 382/274 |

FOREIGN PATENT DOCUMENTS

| | | | |
|---|---|---|---|
| CN | 108024104 | A | 5/2018 |
| CN | 104299187 | B | 8/2018 |
| CN | 109068056 | A | 12/2018 |
| CN | 109741280 | A | 5/2019 |
| CN | 109754375 | A | 5/2019 |
| CN | 110110778 | A | 8/2019 |
| CN | 110648296 | A | 1/2020 |
| CN | 111145192 | A | 5/2020 |
| CN | 111416950 | A | 7/2020 |
| CN | 112529808 | A | 3/2021 |
| CN | 112669197 | A | 4/2021 |
| EP | 3531370 | A2 | 8/2019 |
| JP | 2006261756 | A | 9/2006 |
| JP | 2007312125 | A | 11/2007 |
| JP | 2010118881 | A | 5/2010 |
| WO | 2021010974 | A1 | 1/2021 |
| WO | 2021031819 | A1 | 2/2021 |

* cited by examiner (Raw image)

(LUT 1)

(LUT 2)

(LUT 3)

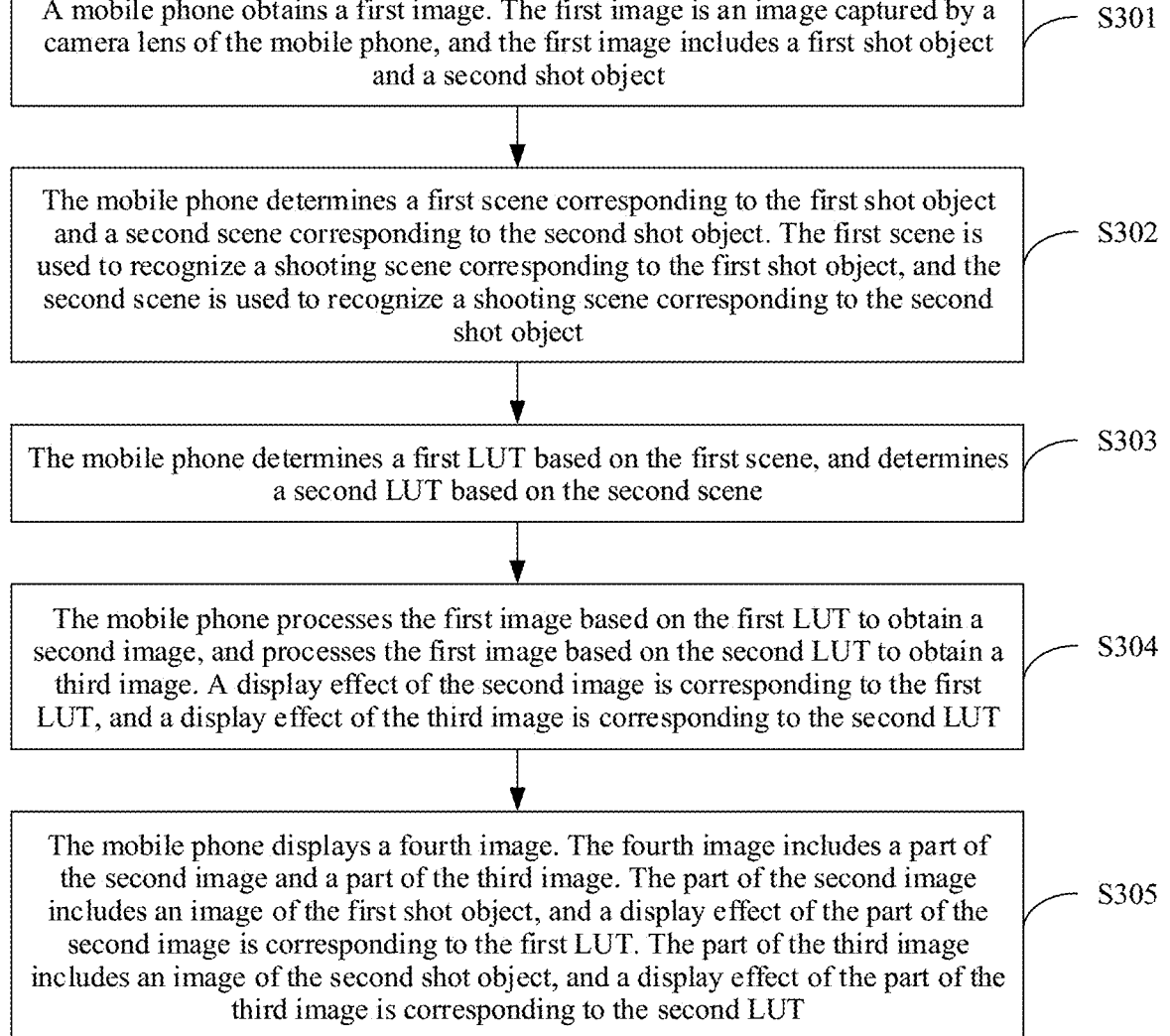

A mobile phone obtains a first image. The first image is an image captured by a camera lens of the mobile phone, and the first image includes a first shot object and a second shot object ⟋ S301

The mobile phone determines a first scene corresponding to the first shot object and a second scene corresponding to the second shot object. The first scene is used to recognize a shooting scene corresponding to the first shot object, and the second scene is used to recognize a shooting scene corresponding to the second shot object ⟋ S302

The mobile phone determines a first LUT based on the first scene, and determines a second LUT based on the second scene ⟋ S303

The mobile phone processes the first image based on the first LUT to obtain a second image, and processes the first image based on the second LUT to obtain a third image. A display effect of the second image is corresponding to the first LUT, and a display effect of the third image is corresponding to the second LUT ⟋ S304

The mobile phone displays a fourth image. The fourth image includes a part of the second image and a part of the third image. The part of the second image includes an image of the first shot object, and a display effect of the part of the second image is corresponding to the first LUT. The part of the third image includes an image of the second shot object, and a display effect of the part of the third image is corresponding to the second LUT ⟋ S305

FIG. 3

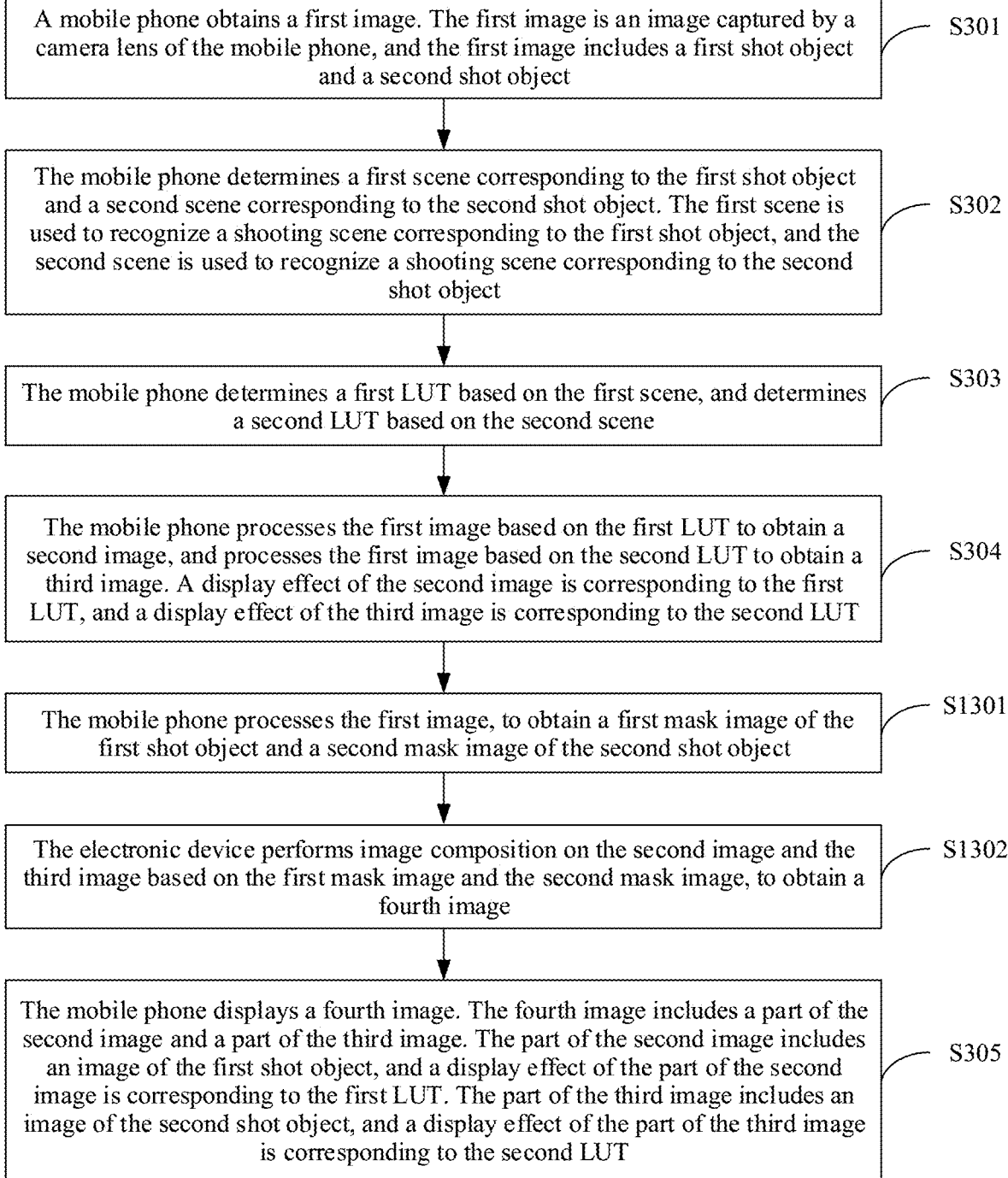

A mobile phone obtains a first image. The first image is an image captured by a camera lens of the mobile phone, and the first image includes a first shot object and a second shot object — S301

The mobile phone determines a first scene corresponding to the first shot object and a second scene corresponding to the second shot object. The first scene is used to recognize a shooting scene corresponding to the first shot object, and the second scene is used to recognize a shooting scene corresponding to the second shot object — S302

The mobile phone determines a first LUT based on the first scene, and determines a second LUT based on the second scene — S303

The mobile phone processes the first image based on the first LUT to obtain a second image, and processes the first image based on the second LUT to obtain a third image. A display effect of the second image is corresponding to the first LUT, and a display effect of the third image is corresponding to the second LUT — S304

The mobile phone processes the first image, to obtain a first mask image of the first shot object and a second mask image of the second shot object — S1301

The electronic device performs image composition on the second image and the third image based on the first mask image and the second mask image, to obtain a fourth image — S1302

The mobile phone displays a fourth image. The fourth image includes a part of the second image and a part of the third image. The part of the second image includes an image of the first shot object, and a display effect of the part of the second image is corresponding to the first LUT. The part of the third image includes an image of the second shot object, and a display effect of the part of the third image is corresponding to the second LUT — S305

FIG. 13

IMAGE PROCESSING METHOD AND ELECTRONIC DEVICE

CROSS-REFERENCE TO RELATED APPLICATIONS

This application is a National Stage of International Application No. PCT/CN2022/090658 filed on Apr. 29, 2022, which claims priority to Chinese Patent Application No. 202110877394.9 filed on Jul. 31, 2021, both of which are incorporated herein by reference in their entireties.

TECHNICAL FIELD

This application relates to the field of image processing, and in particular to an image processing method and an electronic device.

BACKGROUND

Existing mobile phones usually have functions of shooting and video recording. An increasing number of people use the mobile phones to shoot pictures and videos to record life. At present, when a mobile phone processes a shot image, the image may be processed by only a look up table (Look Up Table, LUT) determined when the mobile phone recognizes the image or a LUT selected by a user. In this way, the mobile phone may obtain, by shooting, only a picture or video with a style or display effect corresponding to the LUT, and the style or display effect of the picture or video shot through the mobile phone is simple.

SUMMARY

This application provides an image processing method and an electronic device. Images of different shot objects in one image may be processed by using a plurality of different LUTs, to diversify display effects obtained by shooting or video recording.

According to a first aspect, this application provides an image processing method. The method includes: An electronic device may obtain a first image. The first image is an image captured by a camera lens of the electronic device. The first image includes a first shot object and a second shot object. That is, the first image may include a plurality of shot objects. The electronic device may determine that the first shot object is corresponding to a first scene and the second shot object is corresponding to a second scene. The first scene is used to recognize a shooting scene corresponding to the first shot object, and the second scene is used to recognize a shooting scene corresponding to the second shot object. Different shot objects may be corresponding to different shooting scenes. The electronic device may determine a first LUT based on the first scene, and determine a second LUT based on the second scene. Different shooting scenes may be corresponding to different LUTs. The electronic device processes the first image based on the first LUT to obtain a second image, and processes the first image based on the second LUT to obtain a third image. A display effect of the second image is corresponding to the first LUT, and a display effect of the third image is corresponding to the second LUT. Finally, the electronic device may display a fourth image. The fourth image includes a part of the second image and a part of the third image. The part of the second image includes an image of the first shot object, and a display effect of the part of the second image is corresponding to the first LUT. The part of the third image includes an image of the second shot object, and a display effect of the part of the third image is corresponding to the second LUT. The second LUT is different from the first LUT.

In this solution, the electronic device may process images of different shot objects in one image by using a plurality of different LUTs, to diversify display effects obtained by shooting or video recording.

In a possible design manner of the first aspect, the fourth image may be obtained by image composition of the second image and the third image. The electronic device may perform image composition on the second image and the third image based on a mask image (namely, a first mask image) of the first shot object and a mask image (namely, a second mask image) of the second shot object, to obtain the fourth image. The first mask image may be used to represent pixels corresponding to the first shot object in the second image. The second mask image may be used to represent pixels corresponding to the second shot object in the third image. Therefore, the electronic device may perform image composition on the second image and the third image based on the first mask image and the second mask image, to obtain the fourth image.

Specifically, before the electronic device displays the fourth image, the electronic device may process the first image, to obtain the first mask (Mask) image of the first shot object and the second mask image of the second shot object. Afterwards, the electronic device may perform image composition on the second image and the third image based on the first mask image and the second mask image, to obtain the fourth image. The part of the second image is an image corresponding to the first mask image in the second image. The part of the third image is an image corresponding to the second mask image in the third image.

In the first mask image, a pixel value of a pixel in an image of the first shot object may be a first value, and a pixel value of a pixel in an image except the image of the first shot object in the first mask image may be a second value. The first value is different from the second value, and is used to distinguish the image of the first shot object from another image in the second image. In the second mask image, a pixel value of a pixel in an image of the second shot object may be a first value, and a pixel value of a pixel in an image except the image of the second shot object in the second mask image may be a second value. The first value is different from the second value, and is used to distinguish the image of the second shot object from another image in the third image.

In another possible design manner of the first aspect, to improve an image effect of the fourth image finally displayed by the electronic device and enable the fourth image to be more comfortable when seen by human eyes, and to better express information and a feature in a raw image, before processing the first image to obtain the second image and the third image, the electronic device may perform tone mapping on the first image, to obtain a first image on which tone mapping is performed.

Correspondingly, that the electronic device processes the first image based on the first LUT to obtain a second image, and processes the first image based on the second LUT to obtain a third image includes: the electronic device processes the first image obtained on which tone mapping is performed based on the first LUT, to obtain the second image, and the electronic device processes the first image obtained on which tone mapping is performed based on the second LUT, to obtain the third image.

In another possible design manner of the first aspect, that the electronic device performs tone mapping on the first image to obtain a first image on which tone mapping is performed includes: the electronic device performs tone mapping on the first image by using a gamma curve, to obtain the first image on which tone mapping is performed. In the design manner, a specific implementation in which the electronic device performs tone mapping on the first image is provided.

That is, the tone mapping (Tone Mapping) may include gamma (Gamma) correction. The gamma correction means image correction (namely, tone mapping) by using a gamma curve. The gamma curve (namely, the gamma curve) may be pre-configured in the electronic device.

In another possible design manner of the first aspect, before that the electronic device performs tone mapping on the first image by using a gamma curve, to obtain the first image on which tone mapping is performed, the electronic device may normalize luminance values of pixels in the first image, to obtain the first image obtained by normalizing. The electronic device performs tone mapping on the normalized first image by using the gamma curve, to obtain a second image on which tone mapping is performed.

In another possible design manner of the first aspect, the electronic device recognizes the first image to determine the first scene and the second scene, and the electronic device processes the first image to obtain the first mask image and the second mask image. A calculation amount of the electronic device is large due to a high pixel of the first image, increasing power consumption of the electronic device.

Based on this, before that the electronic device determines that the first shot object is corresponding to a first scene and the second shot object is corresponding to a second scene, the electronic device may perform ratio-based subsampling on the first image at a first preset ratio, to obtain a subsampled first image. Afterwards, the electronic device may recognize the subsampled first image and determine that the first shot object is corresponding to the first scene and the second shot object is corresponding to the second scene. The electronic device processes the subsampled first image, to obtain the first mask image of the first shot object and the second mask image of the second shot object.

Subsampling (subsampling) may also be referred to as downsampling (downsampling). Subsampling is performed on the first image, to reduce the first image. For example, a quantity of pixels of the first image before subsampling may be 4,000*3,000, and a quantity of pixels of the first image after subsampling may be 2,000*1,500.

It should be understood that the "subsampling" in this application is ratio-based subsampling. In this way, a situation in which the first image after subsampling is warped compared with the first image before subsampling may be prevented.

In another possible design manner of the first aspect, to enable a size of the first mask image and a size of the second mask image to match a size of the second image and a size of the third image, the electronic device may upsample the first mask image and the second mask image.

Specifically, before the electronic device performs image composition on the second image and the third image based on the first mask image and the second mask image, to obtain the fourth image, the electronic device may perform ratio-based upsampling on the first mask image and the second mask image respectively at a second preset ratio, to obtain an upsampled first mask image and an upsampled second mask image. Afterwards, the electronic device may compose the second image and the third image based on an upsampled first mask image and an upsampled second mask image, to obtain the fourth image.

It should be understood that the "upsampling" in this application is ratio-based upsampling. In this way, a situation in which an image after subsampling is warped may be prevented.

In another possible design manner of the first aspect, that the electronic device performs image composition on the second image and the third image based on the first mask image and the second mask image, to obtain the fourth image may include: The electronic device determines a first mask region from the second image based on the first mask image, and the electronic device determines a second mask region from the third image based on the second mask image; and the electronic device composes an image in the first mask region with an image in the second mask region, to obtain the fourth image.

In another possible design manner of the first aspect, to improve a display effect of the fourth image, the electronic device may perform feathering on an image in a mask region. Image feathering means an effect of gradually hazing or blurring an image edge in a gradually changing manner. In this way, image change in an edge of each mask region in the fourth image may be smoother and more natural.

Specifically, that the electronic device composes an image in the first mask region with an image in the second mask region, to obtain the fourth image includes: The electronic device feathers an edge region of the image in the first mask region and an edge region of the image in the second mask region, to obtain an image on which feathering is performed in the first mask region and an image on which feathering is performed in the second mask region; and the electronic device composes the image on which feathering is performed in the first mask region and the image on which feathering is performed in the second mask region, to obtain the fourth image.

According to a second aspect, this application provides an electronic device. The electronic device includes a memory, a display, one or more camera lens, and one or more processors. The memory, the display, and the camera lens are coupled to the processor. The memory stores computer program code, and the computer program code includes computer instructions. When the computer instructions are executed by the processor, the electronic device is enabled to perform the method according to the first aspect or any possible design manner of the first aspect.

According to a third aspect, this application provides an electronic device. The electronic device includes a memory, a display, one or more camera lens, and one or more processors. The memory, the display, and the camera lens are coupled to the processor. The memory stores computer program code, and the computer program code includes computer instructions. When the computer instructions are executed by the processor, the electronic device is enabled to perform the following steps. The electronic device obtains a first image. The first image is an image captured by a camera lens of the electronic device. The first image includes a first shot object and a second shot object. The electronic device determines that the first shot object is corresponding to a first scene and the second shot object is corresponding to a second scene. The first scene is used to recognize a shooting scene corresponding to the first shot object, and the second scene is used to recognize a shooting scene corresponding to the second shot object. The electronic device determines a first LUT based on the first scene, and determines a second LUT based on the second scene. The electronic device processes the first image based on the first LUT to obtain a second image, and the electronic device processes the first image based on the second LUT to obtain a third image. A display effect of the second image is corresponding to the first LUT, and a display effect of the third image is corresponding to the second LUT. The electronic device displays a fourth image. The fourth image includes a part of the second image and a part of the third image.

The part of the second image includes an image of the first shot object, and a display effect of the part of the second image is corresponding to the first LUT. The part of the third image includes an image of a second shot object, and a display effect of the part of the third image is corresponding to the second LUT.

In a possible design manner of the third aspect, when the computer instructions are executed by the processor, the electronic device is enabled to further perform the following steps: before displaying the fourth image, processing the first image, to obtain a first mask (Mask) image of the first shot object and a second mask image of the second shot object; and performing image composition on the second image and the third image based on the first mask image and the second mask image, to obtain the fourth image.

A part of the second image is an image corresponding to the first mask image in the second image; and a part of the third image is an image corresponding to the second mask image in the third image.

In another possible design manner of the third aspect, when the computer instructions are executed by the processor, the electronic device is enabled to further perform the following step: performing tone mapping on the first image to obtain a first image on which tone mapping is performed.

When the computer instructions are executed by the processor, the electronic device is enabled to further perform the following step: processing, based on the first LUT, the first image obtained on which tone mapping is performed to obtain a second image, and processing, based on a second LUT, the first image obtained on which tone mapping is performed to obtain a third image.

In another possible design manner of the third aspect, when the computer instructions are executed by the processor, the electronic device is enabled to further perform the following step: performing tone mapping on the first image by using a gamma curve, to obtain a first image on which tone mapping is performed.

In another possible design manner of the third aspect, when the computer instructions are executed by the processor, the electronic device is enabled to further perform the following step: before the performing tone mapping on the first image by using a gamma curve, to obtain a first image on which tone mapping is performed, normalizing luminance values of pixels in the first image, to obtain a normalized first image; and performing tone mapping on the normalized first image by using the gamma curve, to obtain a second image on which tone mapping is performed.

In another possible design manner of the third aspect, when the computer instructions are executed by the processor, the electronic device is enabled to further perform the following step: before determining that the first shot object is corresponding to a first scene and the second shot object is corresponding to a second scene, performing ratio-based subsampling on the first image at a first preset ratio, to obtain a subsampled first image.

The electronic device recognizes the subsampled first image and determines that the first shot object is corresponding to the first scene and the second shot object is corresponding to the second scene. The electronic device processes the subsampled first image, to obtain the first mask image of the first shot object and the second mask image of the second shot object.

In another possible design manner of the third aspect, when the computer instructions are executed by the processor, the electronic device is enabled to further perform the following step: before the performing image composition on the second image and the third image based on the first mask image and the second mask image, to obtain the fourth image, performing ratio-based upsampling on the first mask image and the second mask image respectively at a second preset ratio, to obtain an upsampled first mask image and an upsampled second mask image.

The electronic device composes the second image and the third image based on the upsampled first mask image and the upsampled second mask image to obtain the fourth image.

In another possible design manner of the third aspect, when the computer instructions are executed by the processor, the electronic device is enabled to further perform the following step: determining a first mask region from the second image based on the first mask image, and determining a second mask region from the third image based on the second mask image; and composing an image in the first mask region with an image in the second mask region, to obtain the fourth image.

In another possible design manner of the third aspect, when the computer instructions are executed by the processor, the electronic device is enabled to further perform the following step: feathering an edge region of the image in the first mask region and an edge region of the image in the second mask region, to obtain an image on which feathering is performed in the first mask region and an image on which feathering is performed in the second mask region; and composing the image on which feathering is performed in the first mask region and the image on which feathering is performed in the second mask region, to obtain the fourth image.

According to a fourth aspect, this application provides a computer-readable storage medium. The computer-readable storage medium includes computer instructions. When the computer instructions are run on an electronic device, the electronic device is enabled to perform the method according to the first aspect or any possible design manner of the first aspect.

According to a fifth aspect, this application provides a computer program product. When the computer program product is run on a computer, the computer is enabled to perform the method according to the first aspect or any possible design manner of the first aspect. The computer may be the foregoing electronic device.

It may be understood that for beneficial effects that can be achieved by the electronic device according to the second aspect, any possible design manner of the second aspect, the third aspect, or any possible design manner of the third aspect, the computer storage medium according to the fourth aspect, and the computer program product according to the fifth aspect, refer to the beneficial effects according to the first aspect or any possible design manner of the first aspect. Details are not described herein again.

BRIEF DESCRIPTION OF THE DRAWINGS

FIG. 3 is a flowchart of an image processing method according to an embodiment of this application;

FIG. 13 is a flowchart of an image processing method according to an embodiment of this application;

DETAILED DESCRIPTION OF ILLUSTRATIVE EMBODIMENTS

Terms "first" and "second" mentioned below are merely intended for description, and shall not be understood as indication or implication of relative importance or implicit indication of a quantity of indicated technical features. Therefore, a feature limited by "first" or "second" may explicitly or implicitly include one or more features. In the description of the embodiments, unless otherwise specified, "a plurality of" means two or more.

For ease of understanding, terms involved in the embodiments of this application are described herein in an embodiment of this application:

(1) Red green blue (Red Green Blue, RGB): Three primary colors RGB include red (Red), green (Green), and blue (Blue). A variety of colors may be obtained by mixing light of the three colors at different proportions.

An image captured by a camera lens includes pixels, and each pixel includes a red sub-pixel, a green sub-pixel, and a blue sub-pixel. It is assumed that a value range of R, G, or B is 0 to 255. For example, RGB (255, 0, 0) represents pure red, Green (0, 255, 0) represents pure green, and Blue (0, 0, 255) represents pure blue. In short, a variety of colors may be obtained by mixing the three colors at different proportions.

(2) Look up table (LUT): This may also be referred to as an LUT file or an LUT parameter, and is a red green blue (Red Green Blue, RGB) mapping table.

One image includes a plurality of pixels, and each pixel is represented by an RGB value. A display of an electronic device may display the image based on the RGB value of each pixel in the image. That is, these RGB values determine how the display emits light, to obtain various colors by mixing and present the colors to a user. A color (or a style, or an effect) of the image may be changed by adjusting the RGB values.

Figure 1:
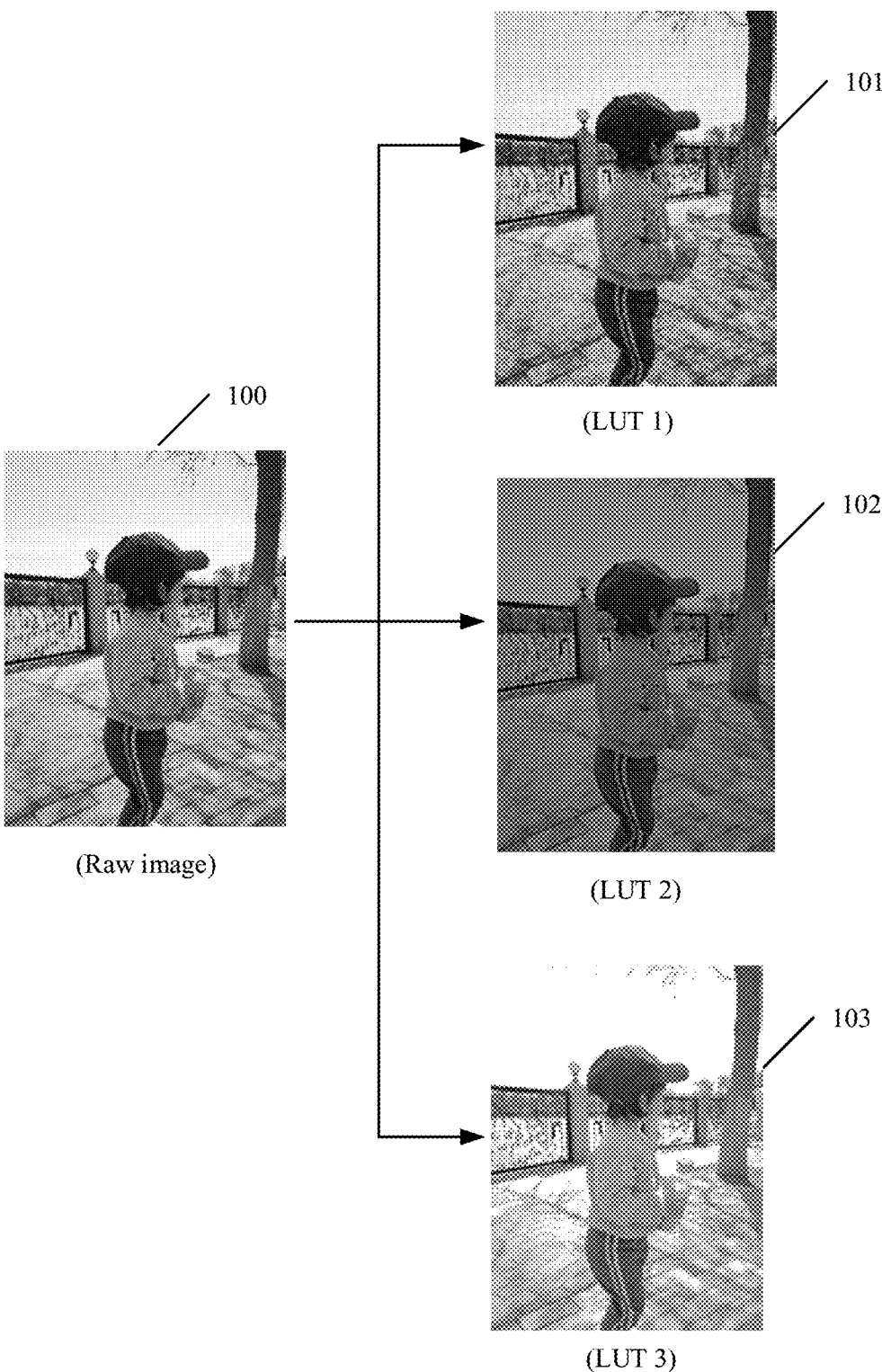
FIG. 1 is a schematic diagram of display effects or styles corresponding to a plurality of LUTs.

An LUT is an RGB mapping table and is used to represent a correspondence of RGB values before and after adjustment. For example, FIG. 1 shows an example of an LUT.

TABLE 1

| Original value | | | Output value | | |
|---|---|---|---|---|---|
| R | G | B | R | G | B |
| 14 | 22 | 24 | 6 | 9 | 4 |
| 61 | 34 | 67 | 66 | 17 | 47 |
| 94 | 14 | 171 | 117 | 82 | 187 |
| . . . | . . . | . . . | . . . | . . . | . . . |
| 241 | 216 | 222 | 255 | 247 | 243 |

An original RGB value of (14, 22, 24) is mapped by an LUT shown in Table 1 to output an RGB value of (6, 9, 4). An original RGB value of (61, 34, 67) is mapped by an LUT shown in Table 1 to output an RGB value of (66, 17, 47). An original RGB value of (94, 14, 171) is mapped by an LUT shown in Table 1 to output an RGB value of (117, 82, 187). An original RGB value of (241, 216, 222) is mapped by an LUT shown in Table 1 to output an RGB value of (255, 247, 243).

It should be noted that, for a same image, a display effect of an image not processed by using an LUT and a display effect of an image processed by using an LUT are different; and display effects with different styles may be achieved if different LUTs are used to process a same image. The "display effect" of an image in this embodiment of this application means an image effect that can be observed by human eyes, after the image is displayed on a display. For example, an LUT 1, an LUT 2, and an LUT 3 shown in FIG. 1 are different look up tables. When the LUT 1 is used to process a raw image 100 captured by a camera lens, an image 101 shown in FIG. 1 may be obtained. When the LUT 2 is used to process the raw image 100, an image 102 shown in FIG. 1 may be obtained. When the LUT 3 is used to process the raw image 100, an image 103 shown in FIG. 1 may be obtained. By comparing the image 101, the image 102, and the image 103 shown in FIG. 1, it may be learned that display effects of the image 101, the image 102, and the image 103 are different.

In conventional technologies, a mobile phone may process one image by using only one LUT. In other words, no matter what image of an object is included in an image to be processed, the mobile processes the image by using only one LUT.

For example, it is assumed that one object image includes images of a plurality of objects such as a character, a green plant, an animal, and a building. The mobile phone may recognize a shooting scene (such as a portrait scene) corresponding to the target image based on factors such as a proportion of images of the objects to the target image. The mobile phone may then process the target image by using a LUT corresponding to the portrait scene. Alternatively, the mobile phone may process the target image by using a LUT corresponding to a shooting scene (such as a portrait scene) selected by the user.

However, when the mobile phone processes a target image (that is, a target image including images of a plurality of objects) in the complex scene, only a LUT corresponding to a shooting scene for one of the objects (such as a character) is used to process the target image. This may affect a display effect of other objects (such as a green plant, an animal, and a building) in the target image. In this way, a shooting style/effect of a photo or video is simple, which cannot meet diversified shooting requirements of current users.

Based on this, an embodiment of this application provides an image processing method. The method may be applied to an electronic device including a camera lens. The electronic device may recognize a first image including a plurality of target objects (such as a first shot object and a second shot object), to obtain LUTs (such as a first LUT and a second LUT) of a shooting scene corresponding to the plurality of target objects. Each LUT may be corresponding to a display effect in a shooting scene. Then the electronic device may segment the target object (such as a portrait) from the first image, to obtain a plurality of mask images. In addition, the electronic device may process the first image by using a LUT corresponding to each shooting scene, to obtain a plurality of processed images. For example, the electronic device processes the first image by using the first LUT, to obtain a second image, or the electronic device processes the first image by using the second LUT, to obtain a third image. Finally, the electronic device may perform image composition on the plurality of processed images, to obtain and display a fourth image including a part of the second image and a part of the third image. In the fourth image, a display effect of the part of the second image is corresponding to the first LUT, and a display effect of the part of the third image is corresponding to the second LUT.

In this solution, the electronic device may process images of different shot objects in one image by using a plurality of different LUTs, to diversify display effects obtained by shooting or video recording.

For example, the electronic device in this embodiment of this application may be a portable computer (such as a mobile phone), a tablet computer, a notebook computer, a personal computer (PC), a wearable electronic device (such as a smart watch), an augmented reality (AR)/virtual reality (VR) device, a vehicle-mounted computer, or the like. A specific form of the electronic device is not specially limited in the following embodiments.

Figure 2:
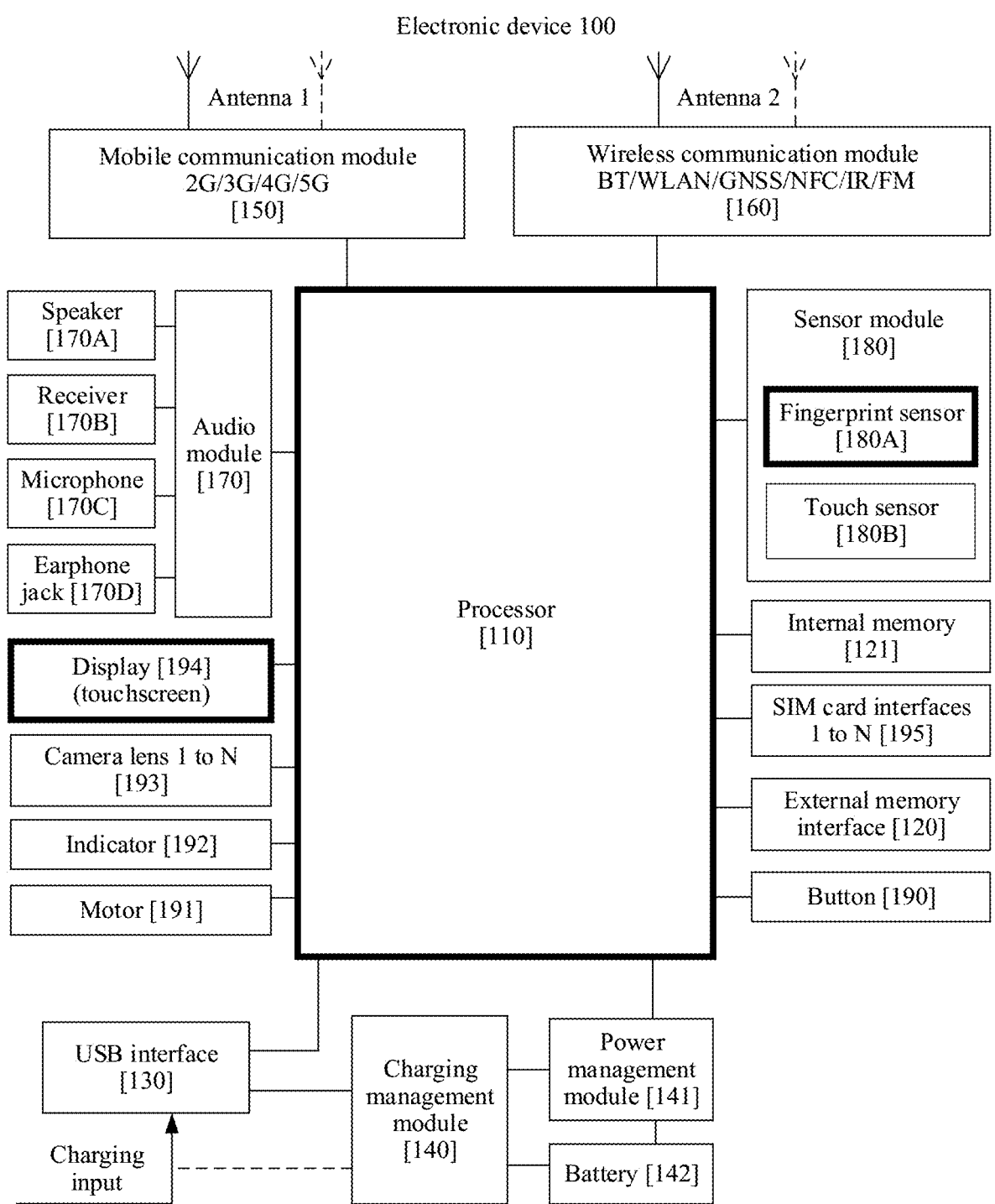
FIG. 2 is a schematic diagram of a hardware structure of an electronic device according to an embodiment of this application.

For example, the foregoing electronic device is a mobile phone. FIG. 2 is a schematic diagram of a structure of an electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, an earphone jack 170D, a sensor module 180, a button 190, a motor 191, an indicator 192, a camera lens 193, a display 194, a subscriber identity module (SIM) card interface 195, and the like.

The sensor module 180 may include a pressure sensor, a gyroscope sensor, a barometric pressure sensor, a magnetic sensor, an acceleration sensor, a distance sensor, an optical proximity sensor, a fingerprint sensor 180A, a temperature sensor, a touch sensor 180B, an ambient light sensor, a bone conduction sensor, and the like.

It may be understood that a structure shown in this embodiment of the present invention does not constitute a specific limitation on the electronic device 100. In some other embodiments of this application, the electronic device 100 may include more or fewer components than those shown in the figure, combine some components, split some components, or have a different component arrangement. The components shown in the figure may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), a micro controller unit (MCU), and/or the like. Different processing units may be separate devices or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110 and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This prevents repeated access and reduces a time for which the processor 110 waits, increasing system efficiency.

In some embodiments, the processor 110 may include one or more interfaces. The interface may include an inter-integrated circuit (I2C) interface, a serial peripheral interface (SPI), an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

It may be understood that an interface connection relationship between modules illustrated in this embodiment of the present invention is merely an illustrative description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The power management module 141 is configured to connect to the battery 142, the charging management module 140, and the processor 110. The power management module 141 receives input from the battery 142 and/or the charging management module 140, and supplies power to the processor 110, the internal memory 121, the external memory, the display 194, the camera lens 193, the wireless communication module 160, and the like. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like. The antenna 1 and the antenna 2 are configured to transmit and receive an electromagnetic wave signal. Each antenna in the electronic device 100 may be configured to cover one or more communication frequency bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communication module 150 may provide a solution applied to the electronic device 100 for wireless communication such as 2G/3G/4G/5G. The wireless communication module 160 may provide wireless communication solutions applied to the electronic device 100, including a wireless local area network (WLAN) (such as a Wi-Fi network), Bluetooth (BT), a global navigation satellite system (GNSS), frequency modulation (FM), NFC, an infrared (IR) technology, and the like.

The electronic device 100 implements a display function by using the GPU, the display 194, an application processor, and the like. The GPU is a microprocessor for image processing and is connected to the display 194 and the application processor. The GPU is configured to perform mathematical and geometric computation and render a graph. The processor 110 may include one or more GPUs and execute program instructions to generate or change display information.

The display 194 is configured to display an image, a video, and the like. The display is a touchscreen. In some embodiments, the electronic device 100 may include 1 or N displays 194, where N is a positive integer greater than 1.

The electronic device 100 may implement a shooting function through the ISP, the camera lens 193, the video codec, the GPU, the display 194, the application processor, and the like. The ISP is configured to process data fed back by the camera lens 193. The camera lens 193 is configured to capture a still image or a video. In some embodiments, the electronic device 100 may include one or N camera lenses 193, where N is a positive integer greater than 1.

The NPU is a neural-network (NN) computing processor, and simulates a biological neural network structure such as a transmission mode between neurons in a human brain, to rapidly process input information, and can perform continuous self-learning. The NPU can implement applications such as intelligent cognition of the electronic device 100, for example, film state recognition, image repair, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a voice playing function or an image playing function), and the like. The data storage area may store data (such as audio data and a phone book) created during use of the electronic device 100, and the like. In addition, the internal memory 121 may include a high-speed random access memory, and may further include a non-volatile memory, for example, at least one magnetic disk storage device, a flash memory device, and a universal flash storage (UFS).

The electronic device 100 may implement an audio function by using the audio module 170, the speaker 170A, the receiver 170B, the microphone 170C, the earphone jack 170D, the application processor, and the like, for example, music playback and recording.

The fingerprint sensor 180A is configured to capture fingerprint information. The electronic device 100 may use fingerprint features of the captured fingerprint information for user identity verification (that is, fingerprint recognition), to implement fingerprint-based unlocking, application lock access, fingerprint-based shooting, fingerprint-based call answering, and the like.

The touch sensor 180B is also referred to as a "touch panel (TP)". The touch sensor 180B may be disposed in the display 194. The touch sensor 180B and the display 194 form a touchscreen, which is also referred to as a "touch screen". The touch sensor 180B is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180B may alternatively be disposed on a surface of the electronic device 100 in a position different from a position of the display 194.

The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

An embodiment of this application provides a shooting method. The method may be applied to an electronic device including a camera lens. In the following embodiment, an example in which the electronic device is a mobile phone is used to describe the method in the embodiments of this application. As shown in FIG. 3, the shooting method may include S301 to S305.

S301: A mobile phone obtains a first image. The first image is an image captured by a camera lens of the mobile phone, and the first image includes a first shot object and a second shot object.

For example, the method in this embodiment of this application may be applied to a scene in which the mobile phone performs shooting or video recording. Alternatively, the method in this embodiment of this application may be applied to a scene in which the mobile phone performs image processing on a photo or a video in a gallery (or album) of the mobile phone.

In some embodiments, the method in this embodiment of this application may be applied to a scene in which a mobile phone performs shooting (referred to as a shooting scene).

Figure 4:
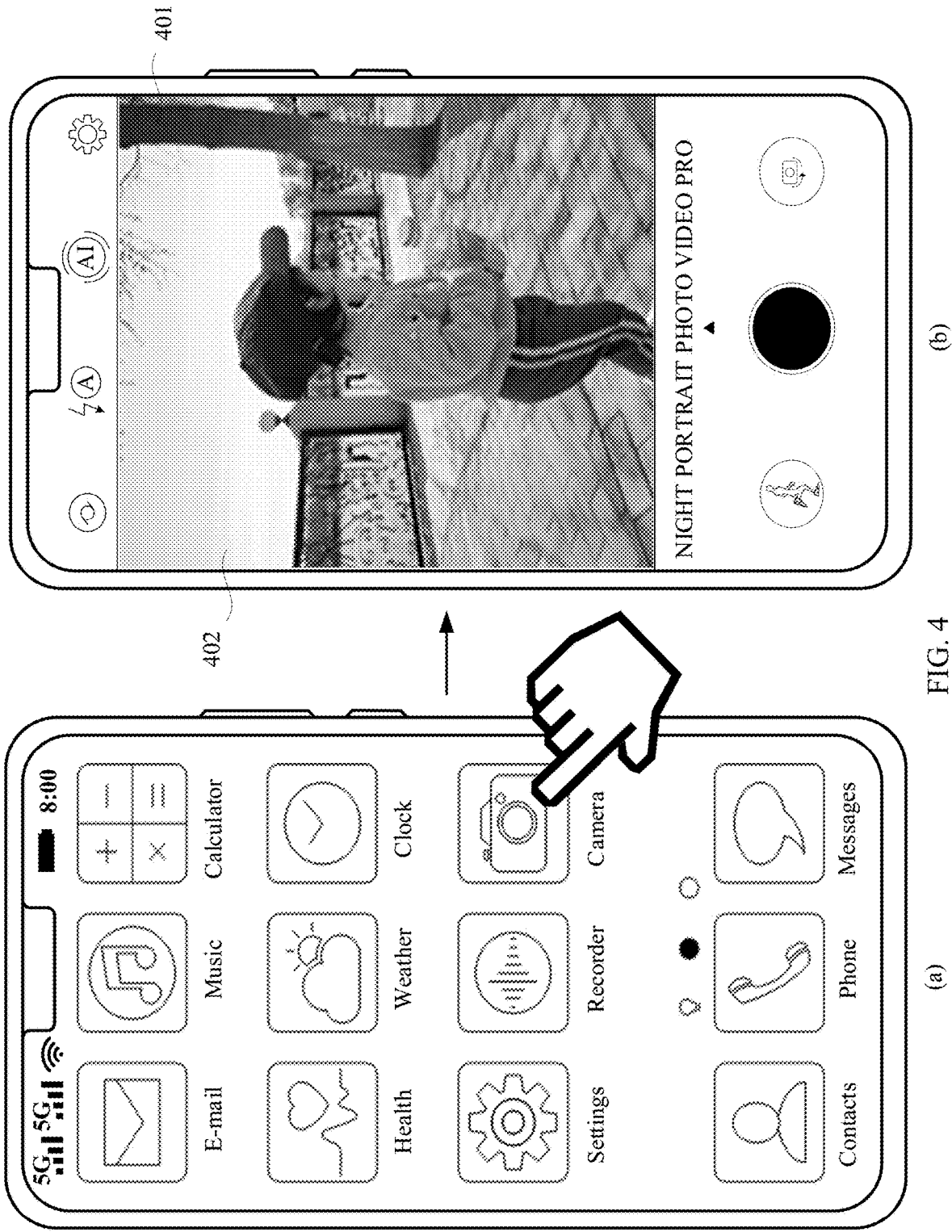
FIG. 4 is a schematic diagram of a display interface of a mobile phone according to an embodiment of this application.

In the shooting scene, the mobile phone may display a preview interface 401 of shooting shown in (b) in FIG. 4 in response to an operation of enabling a camera application by the user. For example, the operation of enabling the camera application may be a tap operation by the user on an application icon of the camera application shown in (a) in FIG. 4. The preview interface 401 of shooting may include a previewed image 402. The previewed image 402 may be a fourth image that is described in S305 and that is obtained after the mobile phone performs S301 to S305 in which the mobile phone processes an image (that is, the first image) captured by the camera lens. The first image may be a raw (RAW) image collected by the camera lens. Specifically, the mobile phone may perform S301 to S305 in response to the operation of enabling the camera application by the user. That is, the mobile phone may perform S301 to capture the first image in response to the operation of enabling the camera application by the user.

Figure 5:
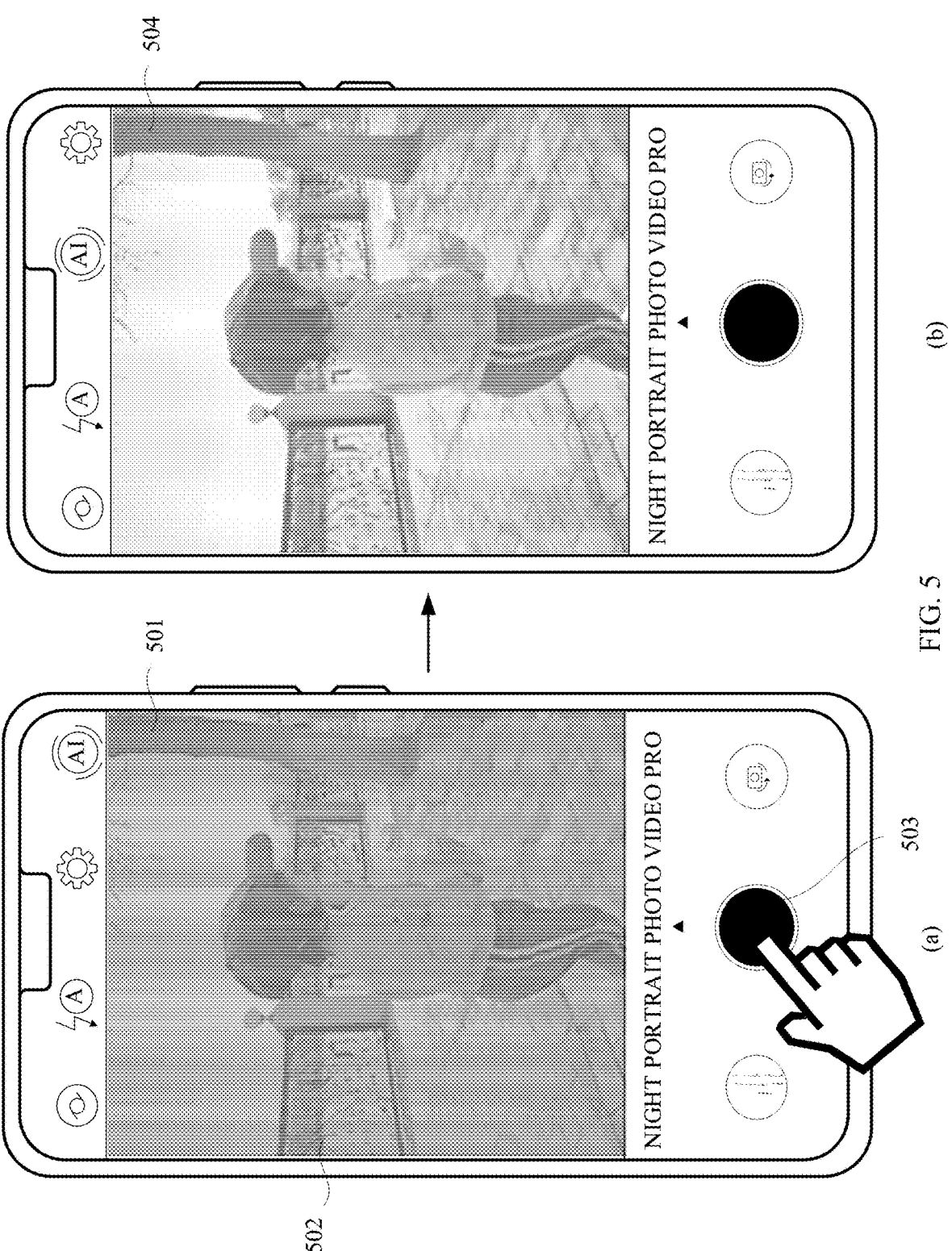
FIG. 5 is a schematic diagram of another display interface of a mobile phone according to an embodiment of this application.

Alternatively, in the shooting scene, the mobile phone may display a preview interface 501 of shooting shown in (a) in FIG. 5 in response to the operation of enabling the camera application by the user. A previewed image 502 displayed in the preview interface 501 of shooting may be a previewed image captured by the camera lens of the mobile phone. The previewed image 502 (namely, the first image) may be a raw image that is captured by the camera lens and that is not processed by the mobile phone. In response to a tap operation by the user on a "shooting shutter" 503 in the preview interface 501, the mobile phone may perform the method in this embodiment of this application to process a previewed image (namely, the foregoing first image) captured by the camera lens, to obtain a fourth image 504 shown in (b) of FIG. 5. Specifically, the mobile phone may perform S301 to S305 in response to the tap operation by the user on the "shooting shutter" 503. That is, the mobile phone may perform S301 to obtain the first image in response to the tap operation by the user on the "shooting shutter" 503, and then perform S302 to S305 to display the fourth image.

In some other embodiments, the method in this embodiment of this application may be applied to a scene in which a mobile phone performs video recording (referred to as a video recording scene).

Figure 6:
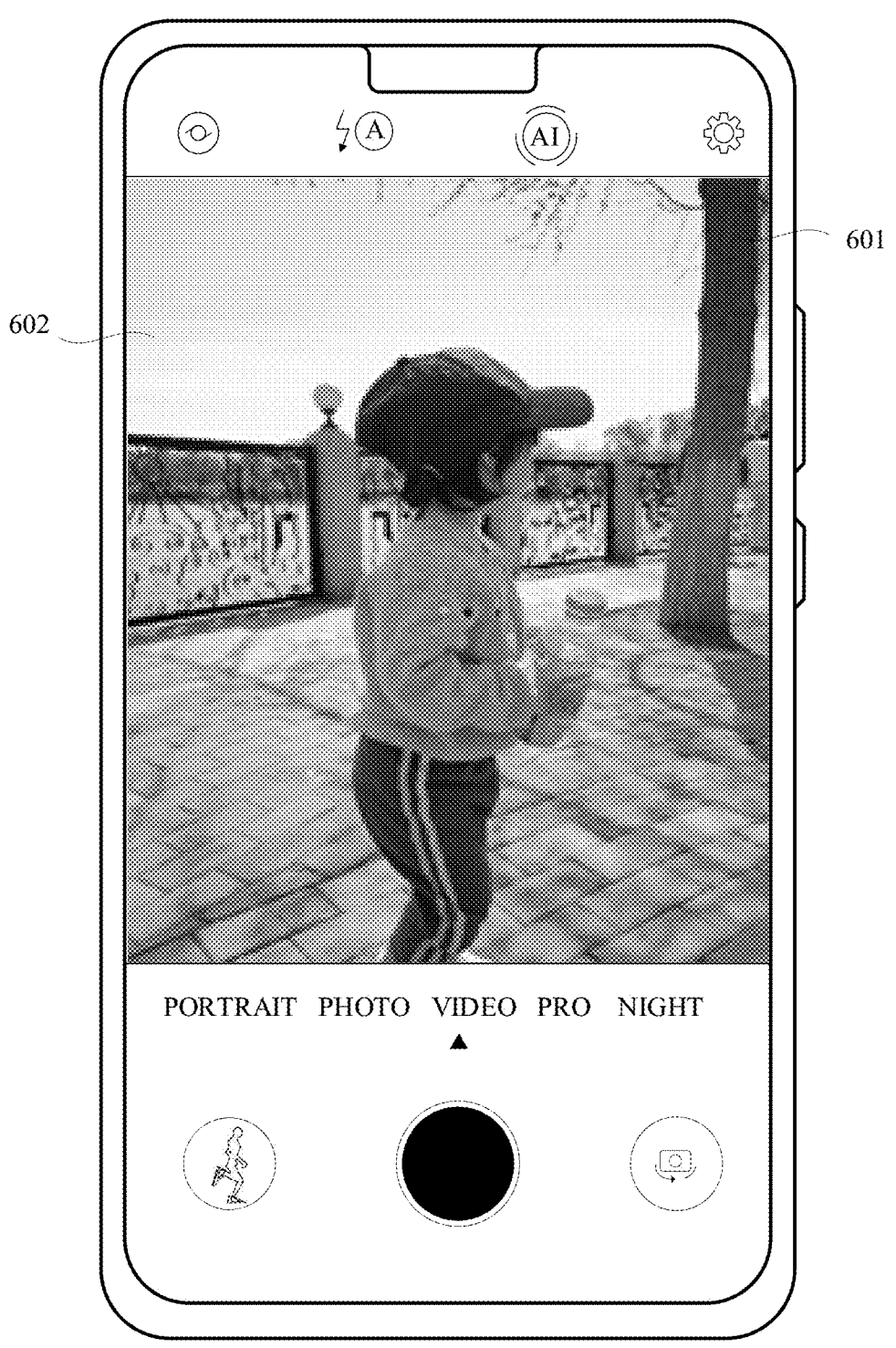
FIG. 6 is a schematic diagram of another display interface of a mobile phone according to an embodiment of this application.

In the video recording scene, the mobile phone may display a preview interface 601 of video recording shown in FIG. 6 in response to an operation of enabling a video recording mode by the user. The preview interface 601 of video recording may include a previewed image 602. For example, the operation of enabling the video recording mode may be a tap operation by the user on a video recording mode option 505 shown in (a) of FIG. 5. The previewed image 602 may be a fourth image that is described in S305 and that is obtained after the mobile phone performs S301 to S305 in which the mobile phone processes an image (that is, the first image) captured by the camera lens. The first image may be a raw image collected by the camera lens. Specifically, the mobile phone may perform S301 to S305 in response to the operation of enabling the video recording mode by the user. That is, the mobile phone may perform S301 to capture the first image in response to the operation of enabling the video recording mode, and then perform S302 to S305 to display the fourth image.

Figure 7:
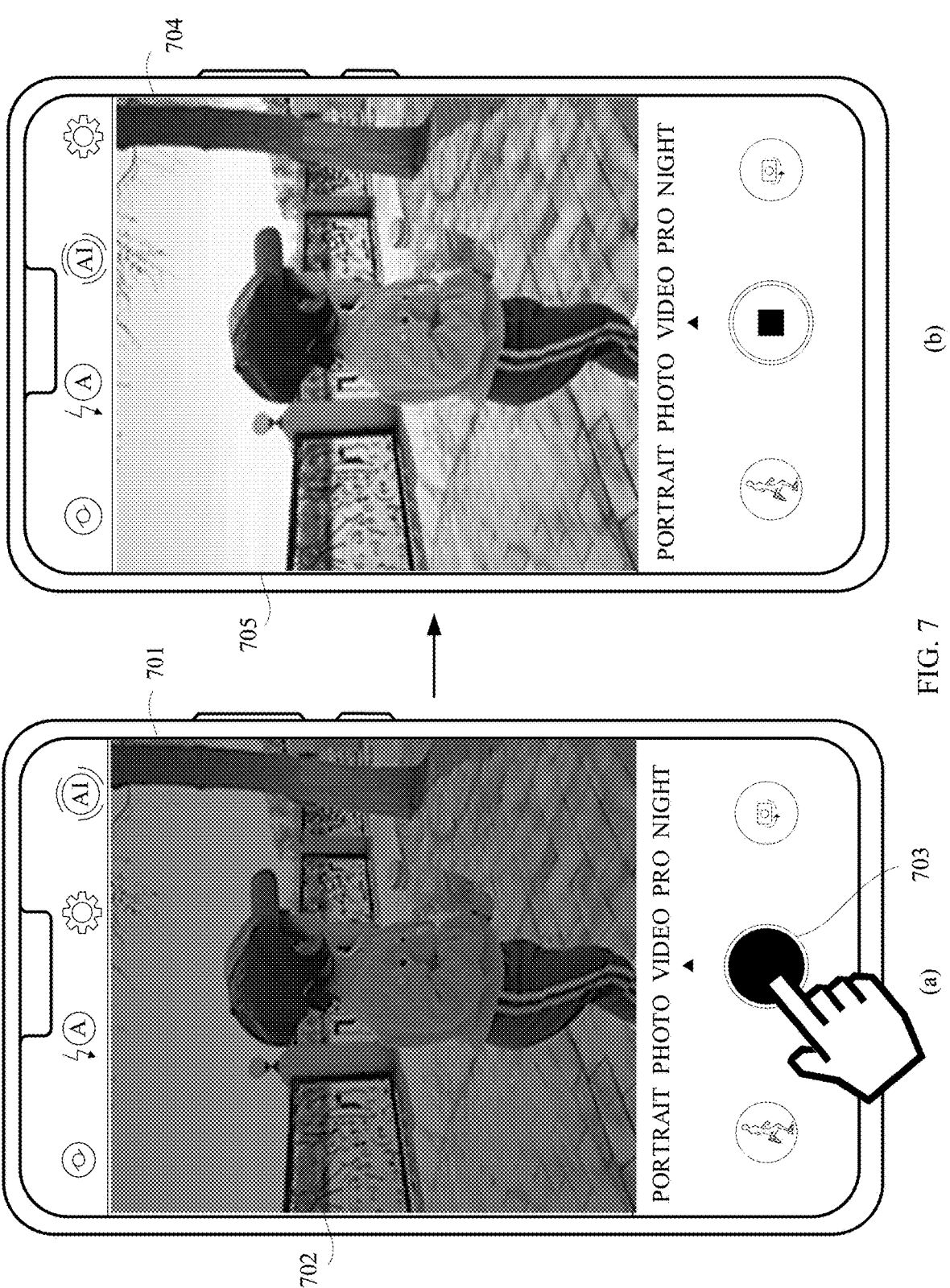
FIG. 7 is a schematic diagram of another display interface of a mobile phone according to an embodiment of this application.

Alternatively, in the video recording scene, the mobile phone may display a view finding interface 701 of video recording shown in (a) in FIG. 7. The view finding interface

701 of video recording includes a previewed image 702, and the previewed image 702 may be a raw image captured by the camera lens. The previewed image 702 may be used as the first image. In response to a tap operation by the user on a "video recording shutter" 703 shown in (a) of FIG. 7, the mobile phone may perform the method in this embodiment of this application, and process an image (namely, the foregoing first image) captured by the camera lens, to obtain a fourth image 705 shown in (b) of FIG. 7. Specifically, the mobile phone may perform S301 to S305 in response to the tap operation by the user on the "video recording shutter" 703. That is, the mobile phone may perform S301 to capture the first image (such as the previewed image 702) in response to the tap operation by the user on the "video recording shutter" 703, and then perform S302 to S305 to display the fourth image.

In some other embodiments, the method according to this embodiment of this application may be applied to a scene in which the mobile phone performs image processing on a photo or a video in the mobile phone gallery (or album) (referred to as an image processing scene after shooting).

In an image processing scene after shooting, the mobile phone may perform S301 to S305 in response to a tap operation by the user on any photo in an album, to obtain and display the fourth image.

Figure 8:
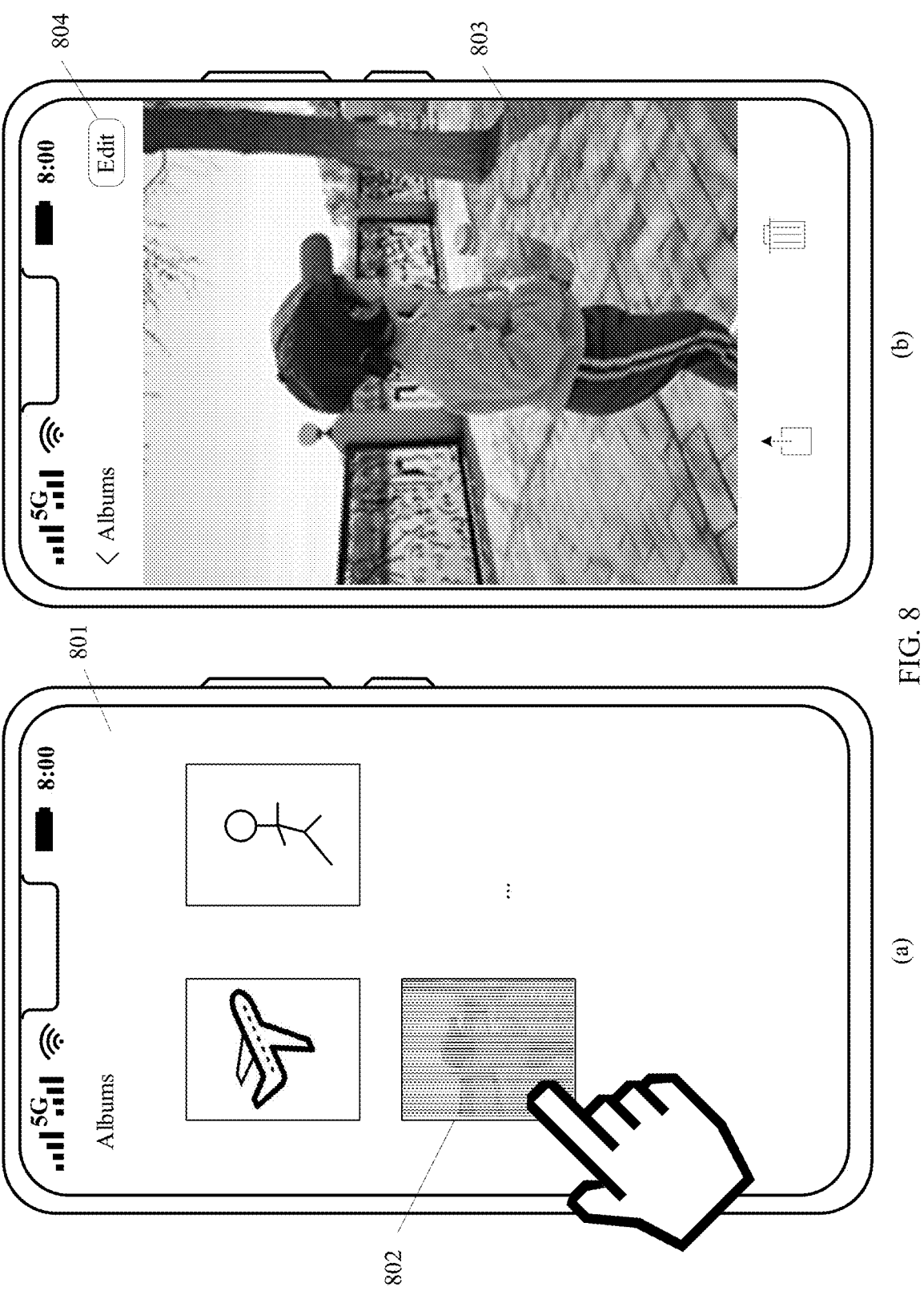
FIG. 8 is a schematic diagram of another display interface of a mobile phone according to an embodiment of this application.

For example, the mobile phone may display an album list interface 801 shown in (a) of FIG. 8. The album list interface 801 includes preview items of a plurality of photos. Generally, the mobile phone may directly display a "little girl" photo (referred to as a first image) corresponding to a preview item 802 in response to a tap operation by the user on the preview item 802 of the "little girl" photo (referred to as the first image) in the album list interface 801. In this embodiment of this application, the mobile phone may perform S301 to S305 in response to a tap operation by the user on a preview item 802 of the "little girl" photo (referred to as to the first image), to obtain and display a fourth image 803 shown in (b) of FIG. 8. A detail page of the photo shown in (b) of FIG. 8 includes not only the fourth image 803, but also an edit button 804. The edit button 804 is used to trigger the mobile phone to edit the fourth image 803.

Alternatively, in an image processing scene after shooting, the user may trigger, in an edit interface of a photo, the mobile phone to perform S301 to S305, to obtain and display the fourth image.

Figure 9A:
FIG. 9A to FIG. 9C are a schematic diagram of another display interface of a mobile phone according to an embodiment of this application.
Figure 9B:
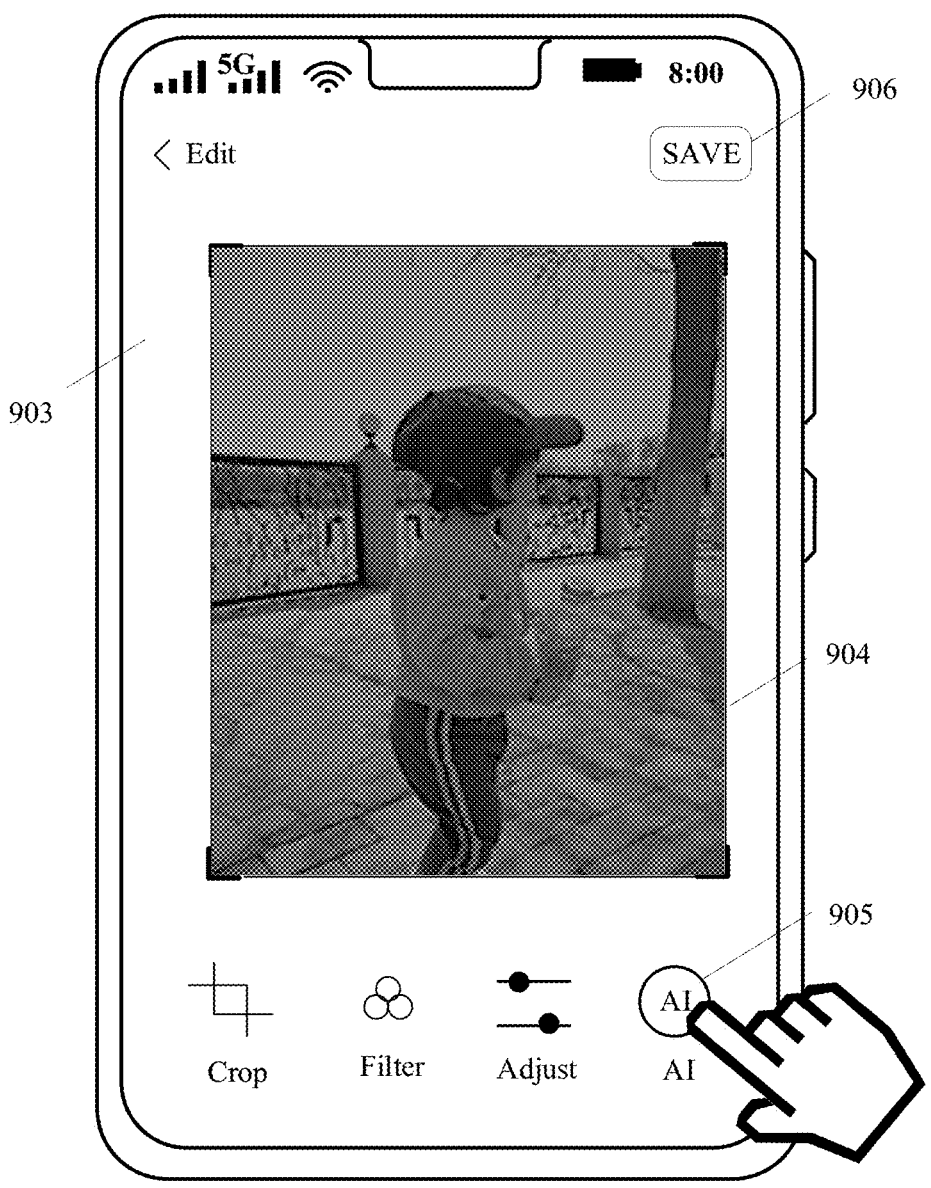

For example, the mobile phone may display a detail page of a photo 901 (namely, the first image) shown in FIG. 9A. In response to a tap operation by the user on an edit button 902 shown in FIG. 9A, the mobile phone may display an edit interface 903 shown in FIG. 9B. The edit interface 903 includes a "Smart AI" button 905, a "Crop" button, a "Filter" button, and an "Adjust" button. The "Smart AI" button 905 is used to trigger the mobile phone to adjust an LUT of the first image. The "Crop" button is used to trigger the mobile phone to crop the first image. The "Filter" button is used to trigger the mobile phone to add a filter effect to the first image. The "Adjust" button is used to trigger the mobile phone to adjust parameters such as contrast, saturation, and luminance of the first image.

Figure 9C:
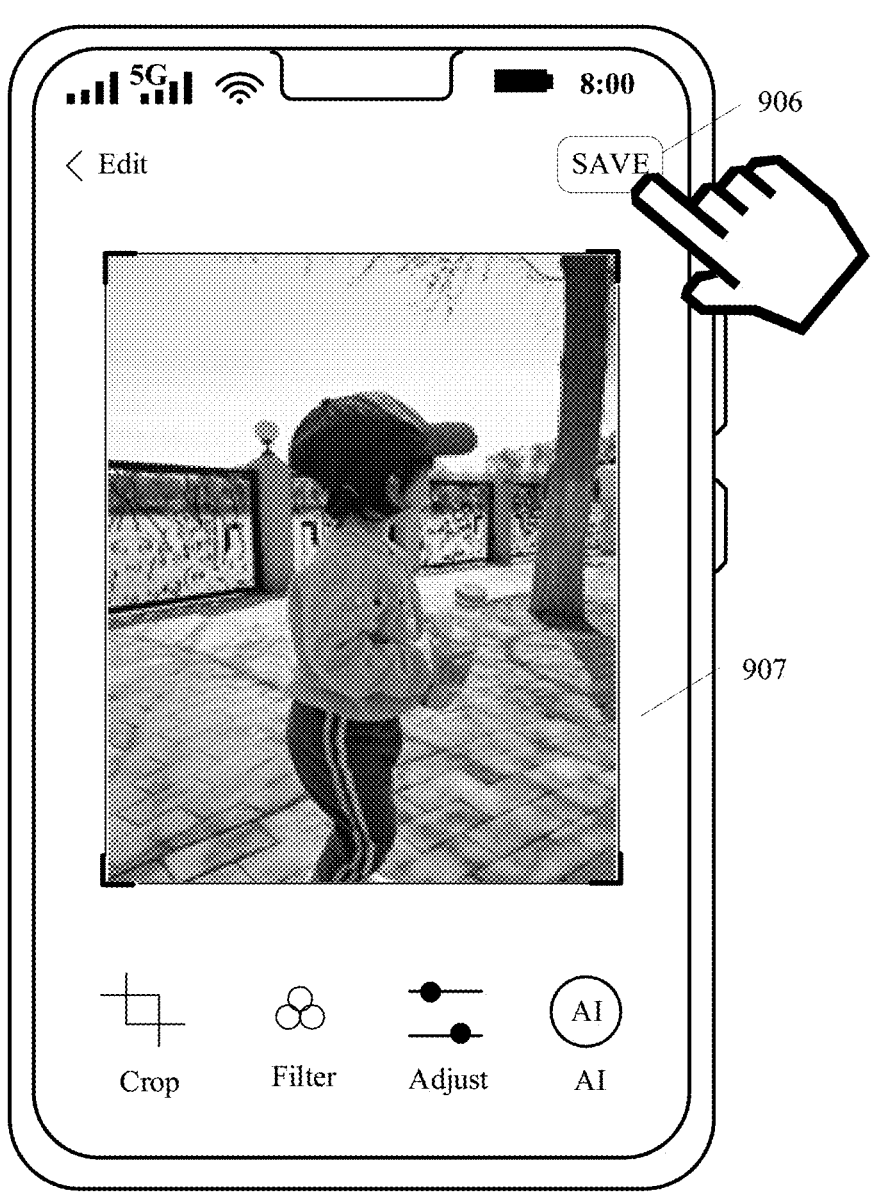
Figure 10:
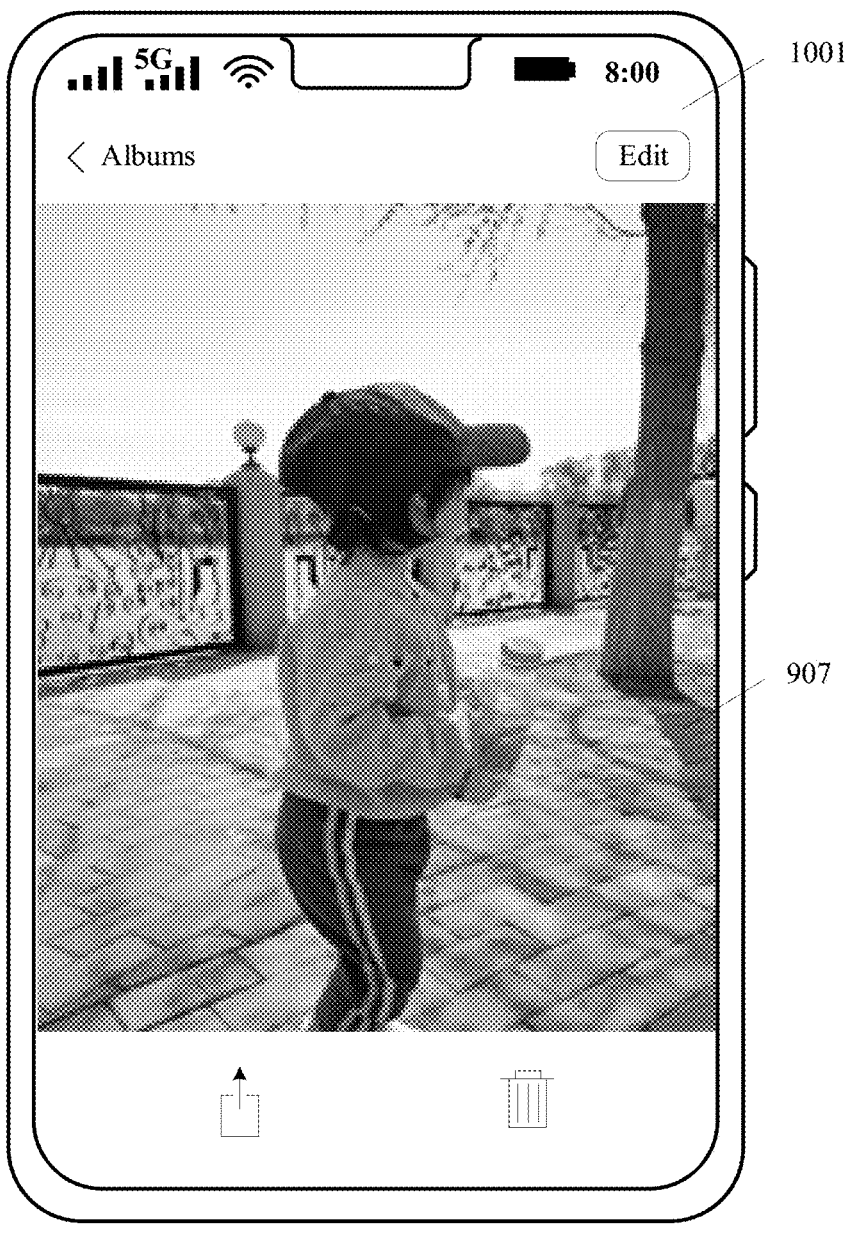
FIG. 10 is a schematic diagram of another display interface of a mobile phone according to an embodiment of this application.

In response to a tap operation by the user on the "Smart AI" button 905, the mobile phone may perform S301 to S305, to obtain and display a fourth image 907 shown in FIG. 9C. An edit interface shown in FIG. 9C includes not only the fourth image 907, but also a save button 906. The save button 906 is used to trigger the mobile phone to save the fourth image 907. In response to a tap operation by the user on the save button 906, the mobile phone may save the fourth image 907 and display a photo detail page of the fourth image 907 shown in FIG. 10.

It should be noted that a method in which the mobile phone performs image processing on a video in the mobile phone gallery (or album) is similar to the method in which the mobile phone performs image processing on a photo in the mobile phone gallery. The details are not described herein again in this embodiment of this application. A difference is that the mobile phone needs to process every frame of image in the video.

In this embodiment of this application, a first shot object and a second shot object may represent two different types of shot objects. For example, the first shot object and the second shot object may be any two of a plurality of types of shot objects such as a portrait, a scenery, gourmet food, a building, and a pet.

It should be noted that the first shot object and the second shot object may be target objects pre-configured or disposed in the mobile phone. In this embodiment, the first image may include one or more first shot objects, and one or more second shot objects. Of course, the shot objects included in the first image are not limited to two, and the method in this embodiment of this application is described by taking only the first image including the first shot object and the second shot object as an example.

S302: The mobile phone determines a first scene corresponding to the first shot object and a second scene corresponding to the second shot object. The first scene is used to recognize a shooting scene corresponding to the first shot object, and the second scene is used to recognize a shooting scene corresponding to the second shot object.

In this embodiment of this application, a plurality of shooting scenes, such as a portrait scene, a travel scene, a gourmet scene, a scenery scene, a building scene, or a pet scene, may be preconfigured in the mobile phone. The first scene and the second scene may be any two of the plurality of shooting scenes.

The mobile phone may recognize the first image and determine, in the first image, a first scene corresponding to the first shot object and the second scene corresponding to the second shot object. For example, the mobile phone may recognize the first image by using a pre-configured image shooting scene detection algorithm, to determine the first scene and the second scene. It should be noted that, for the method in which the mobile phone recognizes the first image to determine the first scene and the second scene, refer to related methods in conventional technologies. Details are not described herein in this embodiment of this application.

S303: The mobile phone determines a first LUT based on the first scene, and determines a second LUT based on the second scene.

A plurality of LUTs (which may be referred to as a plurality of preset LUTs) may be pre-configured in the mobile phone. The plurality of preset LUTs are used to process images captured by the camera lens to obtain images with different display effects. The plurality of preset LUTs are in a one-to-one correspondence with the plurality of shooting scenes one by one. Each preset LUT is corresponding to a display effect in a shooting scene.

For example, as shown in FIG. 1, the image 101 is obtained by using the LUT 1 (namely, a preset LUT 1) to process the raw image 100, the image 102 is obtained by using the LUT 2 (namely, a preset LUT 2) to process the raw image 100, and the image 103 is obtained by using the LUT 3 (namely, a preset LUT 3) to process the raw image 100. According to a comparison, the image 101, the image 102, and the image 103 show different display effects. That is, the preset LUT 1, the preset LUT 2, and the preset LUT 3 may correspond to different display effects or styles.

In this embodiment of this application, different display effects may be display effects in different shooting scenes. For example, the shooting scene may be a portrait scene, a travel scene, a gourmet scene, a scenery scene, a building scene, a pet scene, or the like. It should be noted that the shooting scenes in this embodiment of this application are in a one-to-one correspondence with the display effects or styles. In different shooting scenes, a corresponding LUT may be used to process a previewed image to obtain a corresponding display effect or style.

The mobile phone may determine a preset LUT corresponding to the first scene as the first LUT, and determine a preset LUT corresponding to the second scene as the second LUT.

For example, it is assumed that the plurality of preset LUTs may be corresponding to display effects in the following shooting scenes such as the portrait scene, the travel scene, the gourmet scene, the scenery scene, the building scene, and the pet scene. The mobile phone may recognize whether the first image includes a preset shot object in each of the shooting scenes, to recognize a corresponding shooting scene. For example, it is assumed that the first image includes the following preset shot objects such as a character (namely, a first shot object) and a scenery (namely, a second shot object). The mobile phone recognizes the first image, determines the portrait scene (namely, the first scene) and the scenery scene (namely, the second scene), and obtains two LUTs, including a preset LUT (namely, the first LUT) for the portrait scene and a preset LUT (namely, the second LUT) for the scenery scene.

In an implementation, one preset AI model may be pre-stored in the mobile phone. The preset AI model is capable of recognizing an image to determine a plurality of shooting scenes corresponding to the image.

In this embodiment of this application, the preset AI model may be trained in the following manner. First, a plurality of preset images are obtained, an image feature of each of the plurality of preset images is extracted, and image features of the preset images are classified. The image features of the preset images may be classified based on image features of images captured in the plurality of shooting scenes. Then a classification label of each preset image may be obtained. Finally, each preset image may be used as an input sample, and a classification label of the preset image may be used as an output sample to train the preset AI model. This enables the preset AI model to be capable of recognizing a classification label of an image.

In the implementation, the mobile phone may run the preset AI model by using the first image as an input, to obtain a classification label of the first image. Then the mobile phone may recognize n shooting scenes (including the first scene and the second scene) of the first image based on the classification label of the first image. Finally, the mobile phone may determine n LUTs (including the first LUT and the second LUT) corresponding to the n shooting scenes from a plurality of preset LUTs.

In another implementation, each preset image may be used as an input sample, and an identifier of a shooting scene corresponding to a classification label of the preset image may be used as an output sample, to train the preset AI model. This enables the preset AI model to be capable of specifically recognizing a shooting scene of an image.

In the implementation, the mobile phone may use the first image as an input to run the preset AI model, to obtain an identifier of a plurality of shooting scenes (such as the first scene and the second scene) for the first image. Then the mobile phone may determine a plurality of LUTs (including the first LUT and the second LUT) corresponding to the plurality of shooting scenes from a plurality of preset LUTs.

In another implementation, each preset image may be used as an input sample, and an identifier of a shooting scene corresponding to a classification label of the preset image and a probability that the preset image belongs to each shooting scene may be used as output samples, to train the preset AI model. This enables the preset AI model to be capable of specifically recognizing a shooting scene of an image and recognizing the probability that an image belongs to a different shooting scene.

In the implementation, the mobile phone may use the first image as an input to run the preset AI model, to obtain an identifier of a plurality of shooting scenes for the first image and a probability that the first image belongs to each shooting scene. Then the mobile phone may select, among the plurality of shooting scenes, n shooting scenes (such as the first scene and the second scene) with top n probabilities arranged in descending order of probabilities. Finally, the mobile phone may determine n LUTs (including the first LUT and the second LUT) corresponding to the n shooting scenes from a plurality of preset LUTs.

For example, it is assumed that a shooting scene preconfigured in the mobile phone includes a portrait scene, and a plurality of preset LUTs such as a preset LUT 1, a preset LUT 2 (such as a background LUT), and a preset LUT 3 (such as portrait LUT) are preconfigured in the mobile phone. In the following embodiment, a method of performing S301 to S303 by the mobile phone is described with reference to FIG. 11.

Figure 11:
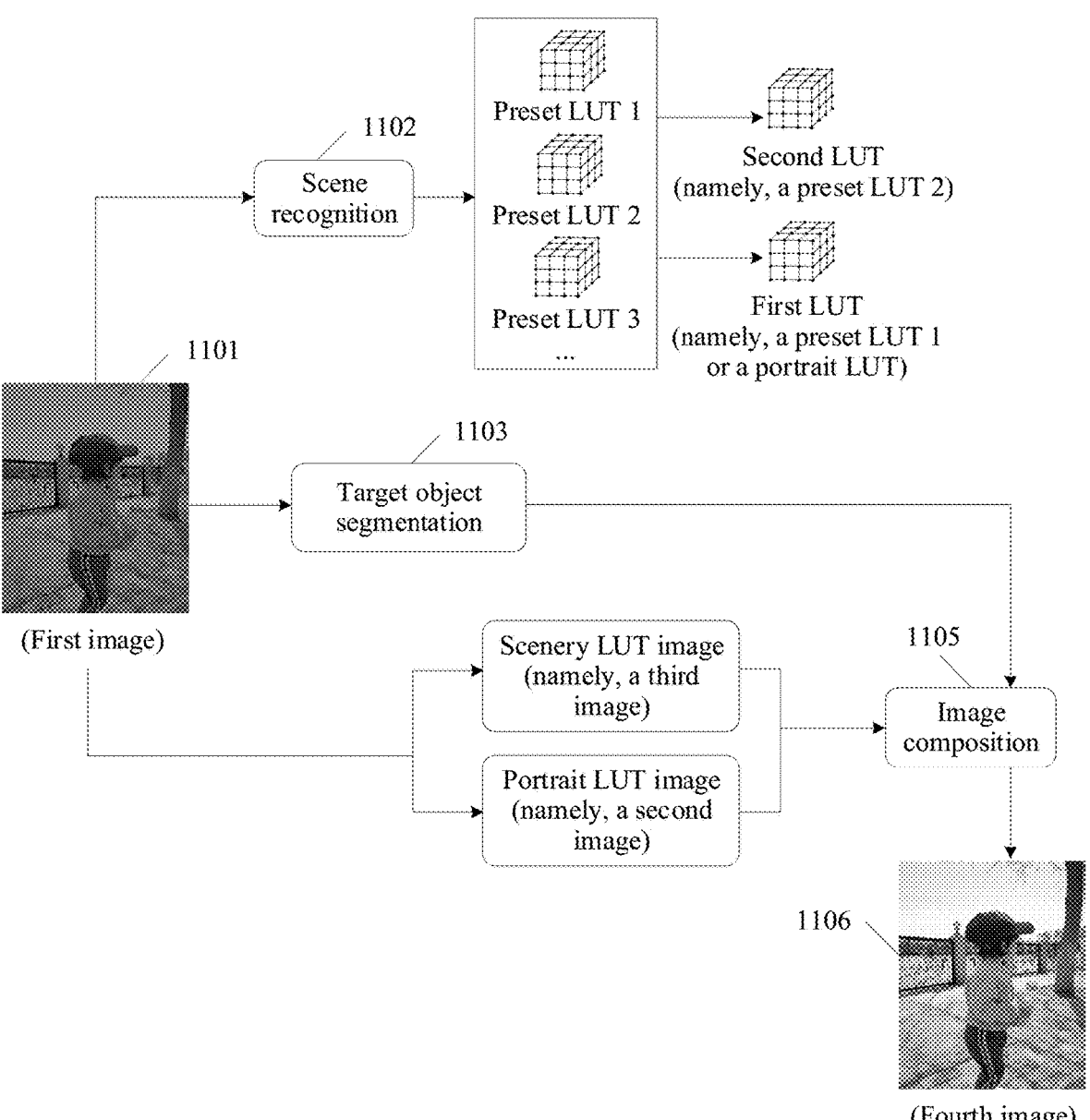
FIG. 11 is a schematic diagram of a principle of an image processing method according to an embodiment of this application.

The mobile phone may perform S301 to capture a first image 1101 shown in FIG. 11. The first image 1101 includes a first shot object (such as a character) and a second shot object (such as a scenery). Afterwards, the mobile phone may perform S302, perform scene recognition 1102 shown in FIG. 11 on the first image 1101, and determine that a shooting scene corresponding to the first image 1101 includes a portrait scene (namely, the first scene) and a scenery scene (namely, the second scene). Then as shown in FIG. 11, the mobile phone may select a preset LUT 3 (such as the portrait LUT, namely, the first LUT) for the portrait scene and a preset LUT 2 (such as a scenery LUT, namely, the second LUT) for the scenery scene from a plurality of preset LUTs such as the preset LUT 1, the preset LUT 2 (namely, the background LUT), and the preset LUT 3 (namely, the portrait LUT).

S304: The mobile phone processes the first image based on the first LUT to obtain a second image, and processes the first image based on the second LUT to obtain a third image. A display effect of the second image is corresponding to the first LUT, and a display effect of the third image is corresponding to the second LUT.

In this embodiment of this application, a method of performing S304 by the mobile phone is described herein with reference to FIG. 11. The mobile phone processes the first image based on the portrait LUT shown in FIG. 11, to obtain a portrait LUT image (namely, the second image) shown in FIG. 11. The mobile phone processes the second image based on the scenery LUT shown in FIG. 11, to obtain a scenery LUT image (namely, the third image) shown in FIG. 11. In the method of processing an image by the mobile phone by using a LUT to obtain a processed image, refer to a related method in conventional technologies. Details are not described herein in this embodiment of this application.

S305: The mobile phone displays a fourth image, where the fourth image includes a part of the second image and a part of the third image. The part of the second image includes an image of the first shot object, and a display effect of the part of the second image is corresponding to the first LUT. The part of the third image includes an image of a second shot object, and a display effect of the part of the third image is corresponding to the second LUT.

As shown in FIG. 11, the mobile phone may perform image composition 1105 on the portrait LUT image (namely, the second image) and the scenery LUT image (namely, the third image) to obtain the fourth image 1106. After comparison of the first image 1101 with the fourth image 1106, it may be learned that a display effect of a portrait in the fourth image 1106 is superior to a display effect of a portrait in the first image 1101, and a display effect of a background image except the portrait in the fourth image 1106 is superior to a display effect of a background image expect the portrait in the first image 1101.

It should be noted that the portrait and the background image except the portrait in the fourth image 1106 are obtained by processing the first image 1101 based on different LUTs. The portrait in the fourth image 1106 is obtained by processing the first image 1101 based on a LUT corresponding to a character scene, and a display effect of the portrait may be highlighted based on the display effect of the character scene. The background image except the portrait image in the fourth image 1106 is obtained by processing the first image 1101 based on a LUT corresponding to a scenery scene, and a display effect of the background image may be highlighted based on a display effect of the scenery scene.

An embodiment of this application provides an image processing method. A mobile phone may process images of different shot objects in one image by using a plurality of different LUTs, to diversify a display effect obtained by shooting or video recording.

In some embodiments, to improve an image effect of the fourth image finally displayed by the mobile phone, so that the fourth image is more comfortable when seen by human eyes and better expresses information and a feature in a raw image, before performing S304, the mobile phone may perform tone mapping on the first image. Then the mobile phone may perform S304, process, based on the first LUT, the first image obtained on which tone mapping is performed to obtain a second image, and process, based on a second LUT, the first image obtained on which tone mapping is performed to obtain a third image.

Figure 12:
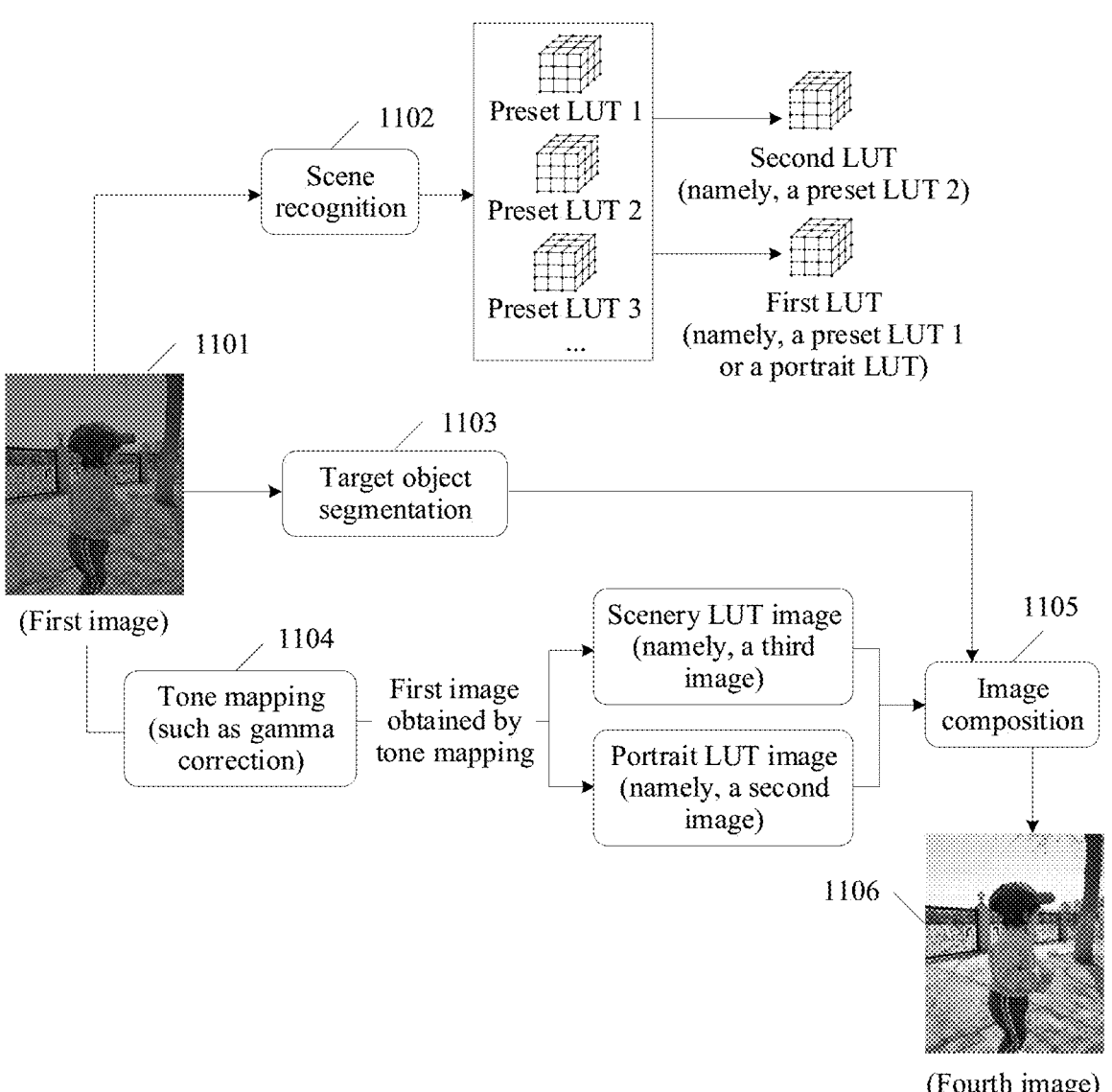
FIG. 12 is a schematic diagram of a principle of an image processing method according to an embodiment of this application.

For example, in this embodiment of this application, with reference to FIG. 11, the method in this embodiment is described in FIG. 12. As shown in FIG. 12, the mobile phone may perform tone mapping (such as gamma correction) 1104 on the first image, to obtain a first image on which tone mapping is performed. Tone mapping means adjusting a gray level of an image, to enable a processed image to be more comfortable when seen by human eyes and to better express information and a feature in a raw image.

For example, the tone mapping (Tone Mapping) described in this embodiment of this application may include gamma (Gamma) correction. The gamma correction means image correction (namely, tone mapping) by using a gamma curve. That is, the mobile phone may perform tone mapping on the first image by using the gamma curve, to obtain a first image on which tone mapping is performed.

The gamma curve (namely, a Gamma curve) may be pre-configured in the mobile phone. For example, the gamma curve may be pre-configured in an image signal processor (ISP) of the mobile phone. The ISP may include one gamma module. The gamma curve is configured in the gamma module for tone mapping of an image.

It should be understood that a tone change of pixels in an image (referred to as a raw image) captured by a camera lens is linear, while a tone change acceptable by human eyes is non-linear. Through the tone mapping (such as the gamma correction), the image may be converted from an image with linear tone change to an image with non-linear tone change, and an obtained image by conversion better conforms to an input characteristic of human eyes.

The gamma curve may perform tone mapping on a normalized image. Therefore, before S304, the method in this embodiment of this application further includes: The mobile phone normalizes luminance values of pixels in the first image, to obtain a normalized first image. The mobile phone may perform tone mapping on the normalized first image by using the gamma curve, to obtain a first image on which tone mapping is performed.

The fourth image in S305 may be obtained by composition of the second image and the third image. Optionally, in some embodiments, the mobile phone may perform image composition on the second image and the third image based on a mask image (namely, a first mask image) of the first shot object and a mask image (namely, a second mask image) of a second shot object, to obtain the fourth image. For a detailed description of the first mask image and the second mask image, refer to content in the following embodiment. Details are not described herein. Specifically, as shown in FIG. 13, before S305, the method in this embodiment of this application may further include S1301 and S1302.

S1301: The mobile phone processes the first image, to obtain the first mask image of the first shot object and the second mask image of the second shot object.

The mobile phone may obtain an image of the first shot object from the first image through segmentation, and process the image of the first shot object, to obtain the first mask image. The first mask image may represent pixels corresponding to the first shot object in the first image.

The mobile phone may obtain an image of the second shot object from the first image by segmentation, and process the image of the second shot object, to obtain the second mask image. The second mask image may represent pixels corresponding to the second shot object in the first image.

Figure 14:
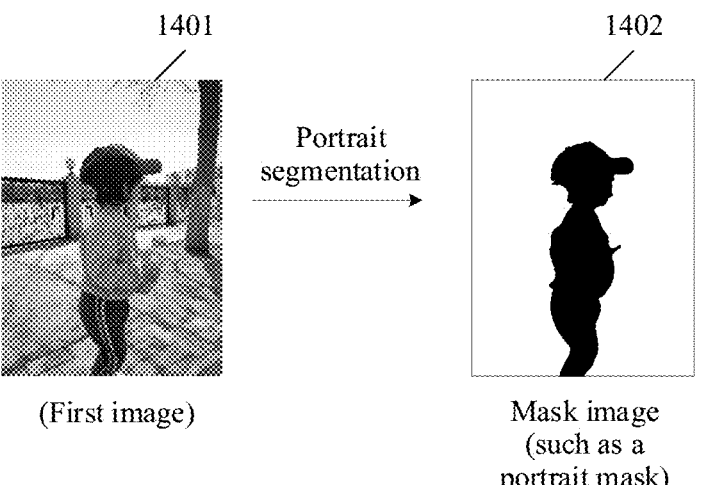
FIG. 14 is a schematic effect diagram of a mask image obtained by image segmentation (such as portrait segmentation) of a target object according to an embodiment of this application.

For example, the mask image described in this embodiment of this application is described by using the first mask image as an example. For example, it is assumed that the first shot object is a portrait, and the first mask image may be a mask image of the portrait. As shown in FIG. 14, the mobile phone may perform portrait segmentation on a first image 1401, to obtain a portrait mask image 1402.

For example, in the first mask image described in this embodiment of this application, a pixel value of a pixel in an image of the first shot object may be a first value, and a pixel value of a pixel in an image except the image of the first shot object in the first mask image may be a second value. The first value is different from the second value, and is used to distinguish the image of the first shot object from another image in the second image. For example, the first value may be 1, and the second value may be 0.

For example, in FIG. 14, a portrait is a part filled with black in the mask image 1402, and a pixel value of the portrait may be 1. In FIG. 14, another image except the portrait is a part filled with white in the mask image 1402, and a pixel value of the another image may be 0.

S1302: The electronic device performs image composition on the second image and the third image based on the first mask image and the second mask image, to obtain the fourth image.

In S305, a part of the second image is an image corresponding to the first mask image in the second image; and a part of the third image is an image corresponding to the second mask image in the third image.

Figure 15:
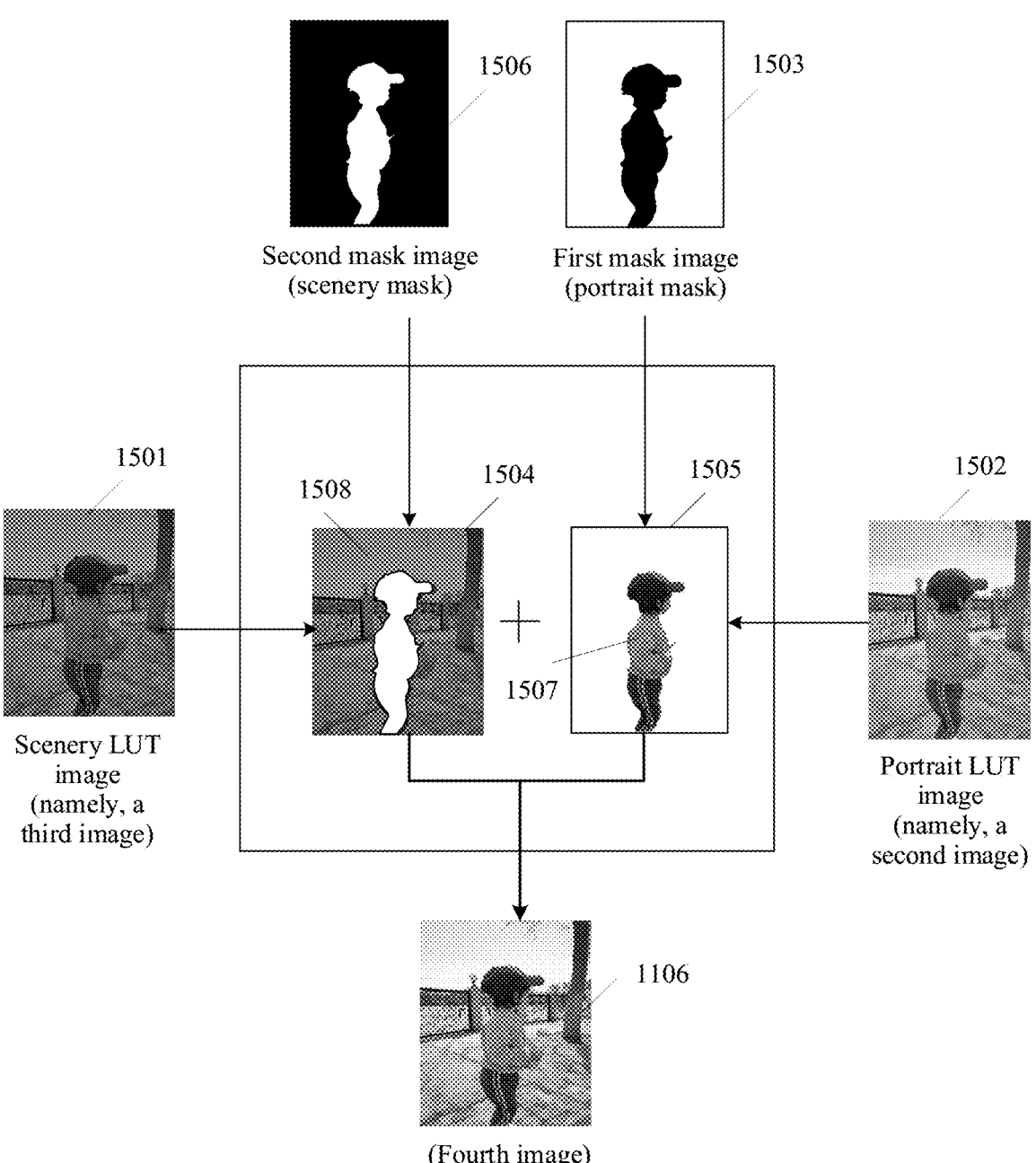
FIG. 15 is a schematic diagram of a principle of image composition according to an embodiment of this application.

For example, the first shot object is a portrait, and the second shot object is a scenery. In this embodiment of this application, a principle of image composition 1105 in FIG. 11 or FIG. 12 is described with reference to FIG. 15. As shown in FIG. 15, the mobile phone may perform target object segmentation 1103 shown in FIG. 11 or FIG. 12, to obtain a mask image of a target object from the first image 1101 by segmentation. For example, the mobile phone may obtain a first mask image (such as a portrait) of a first shot object and a second mask image (such as a scenery) of a second shot object by segmentation. The mobile phone obtains a portrait image 1505 from a portrait LUT image (namely, a second image) 1502 based on a first mask image (namely, a portrait mask) 1503 shown in FIG. 15. As shown in FIG. 15, the mobile phone may obtain a scenery image 1504 from a scenery LUT image (namely, a third image) 1501 based on a second mask image (namely, a scenery mask) 1506. The portrait image 1505 shown in FIG. 15 includes a portrait and does not include a background image. The background image 1504 shown in FIG. 15 includes the scenery image and does not include the portrait. Then, as shown in FIG. 15, the mobile phone may perform image composition on the background image 1504 and the portrait image 1505, to obtain a fourth image 1106.

For example, S1302 may include S1302a and S1302b.

S1302a: The mobile phone determines a first Mask region from the second image based on the first Mask image, and determines a second Mask region from the third image based on the second Mask image.

For example, as shown in FIG. 15, the mobile phone may determine a first mask region 1507 from the portrait LUT image 1502 (namely, the second image) based on the first mask image (namely, the portrait mask) 1503. The first mask region 1507 is a region indicated in the portrait LUT image 1502 (namely, the second image) and corresponding to the first mask image 1503.

As shown in FIG. 15, the mobile phone may determine a second mask region 1508 from the scenery LUT image 1501 (namely, the third image) based on the second mask image (namely, the scenery mask) 1506. The second mask region 1508 is a region indicated in the scenery LUT image 1501 (that is, the third image) and corresponding to the second mask image 1506.

It should be noted that the third image 1501 shown in FIG. 15 and the second image 1502 shown in FIG. 15 are obtained by processing a same image (namely, the first image) using different LUTs. It may be learned from FIG. 15 that a display effect of the third image 1501 is different from a display effect of the second image 1502. The "display effect" of an image in this embodiment of this application means an image effect that can be observed by human eyes, after the image is displayed on a display.

S1302b: The electronic device composes an image in the first mask region with an image in the second mask region, to obtain the fourth image.

For example, the mobile phone may compose the image 1505 in the first mask region 1507 with the image 1504 in the second mask region 1508, to obtain the fourth image 1106.

In some embodiments, to improve a display effect of the fourth image, the mobile phone may perform feathering on an image in a mask region. Image feathering means an effect of gradually hazing or blurring an image edge in a gradually changing manner. In this way, image change in an edge of each mask region in the fourth image may be smoother and more natural.

Specifically, the mobile phone may feather an edge region of an image in the first mask region, to obtain an image on which feathering is performed in the first mask region. The mobile phone may feather an edge region of an image in the second mask region, to obtain an image on which feathering is performed in the second mask region. Then the mobile phone may compose the image on which feathering is performed in the first mask region and the image on which feathering is performed in the second mask region, to obtain the fourth image.

It may be learned from the foregoing embodiment that, in the first mask image, a pixel value of a pixel in the image in the first mask region is a first value, and a pixel value of a pixel in an image in another region is a second value. In the second mask image, a pixel value of a pixel in an image in the second mask region is the first value, and a pixel value of a pixel in an image in another region is the second value. For example, the first value may be 1, and the second value may be 0.

For example, in the first mask image, the pixel value of a pixel in the image in the first mask region is 1, and the pixel value of a pixel in an image in another region is 0. An edge region of the image in the first mask region in the first mask image is feathered, so that a pixel value of a pixel in the edge region is between 0 and 1 and is a floating point decimal.

It may be understood that feathering of an image in the edge region of the first mask region and an image in the edge region of the second mask region may enable the image in the edge region of the first mask region and the image in the edge region of the second mask region (namely, adjacent regions of the first mask region and the second mask region) to change more smoothly and naturally. In this way, a display effect of the fourth image may be improved.

The mobile phone recognizes the first image to determine the first scene and the second scene, and the mobile phone processes the first image to obtain the first mask image and the second mask image. A calculation amount of the mobile phone is large due to high pixel values of the first image, increasing power consumption of the mobile phone.

Based on this, in some embodiments, the mobile phone may further subsample the first image before performing S302 and S1301. Specifically, after S301 and before S302 and S1301, the method in this embodiment of this application may further include: The mobile phone performs equal-ratio subsampling on the first image at a first preset ratio, to obtain a subsampled first image.

Subsampling (subsampling) may also be referred to as downsampling (downsampling). Subsampling is performed on the first image, to reduce the first image. For example, a quantity of pixels of the first image before subsampling may be 4,000*3,000, and a quantity of pixels of the first image after subsampling may be 2,000*1,500.

Specifically, subsampling is performed for the following two main purposes: (1) enabling an image to conform to a size of a display region; and (2) generating a thumbnail of a corresponding image. In this embodiment of this application, a purpose of subsampling the first image is to generate a thumbnail of the first image. In this way, a calculation amount in which the mobile phone performs S302 and S1301 may be reduced.

It should be understood that the "subsampling" described in this embodiment of this application is ratio-based subsampling. In this way, a situation in which the first image after subsampling is warped compared with the first image before subsampling may be prevented.

For example, the first preset ratio may be a ratio preconfigured in the mobile phone such as 4:1, 2:1, or 3:1. For example, the first preset ratio is 4:1. Assuming that a quantity of pixels of the first image before subsampling is 4,000*3,000, a quantity of pixels of a first image after subsampling is 2,000*1,500. For example, the first preset ratio is 9:1. Assuming that a quantity of pixels of the first image before subsampling is 9,000*3,000, a quantity of pixels of a first image after subsampling is 3,000*1,000.

In this embodiment of this application, the mobile phone may perform ratio-based subsampling on the first image for a plurality of times, to obtain an effect of subsampling the first image. For example, assuming that the first preset ratio is 16:1, the quantity of pixels of the first image before subsampling is 6,000*2,000. The mobile phone may first subsample the first image with a resolution of 6,000*2,000 at a ratio of 4:1, to obtain a first image with a resolution of 3,000*1,000. Then the mobile phone may subsample the first image with a resolution of 3,000*1,000 at a ratio of 4:1, to obtain a first image with a resolution of 1,500*500.

It should be noted that subsampling the first image affects image quality of the first image. However, in this embodiment of this application, a subsampled first image is used to recognize a mask image of a shooting scene and a mask image of a target object. The image quality does not affect a recognition result greatly but a calculation amount of the mobile phone can be reduced to a great extent and power consumption of the mobile phone can be reduced.

In this embodiment of this application, in a method in which the mobile phone specifically subsamples the first image, refer to a related method in conventional technologies. Details are not described herein in an example of this application.

Correspondingly, S302 may be replaced as follows: The mobile phone determines that a first shot object in a subsampled first image is corresponding to the first scene, and a second shot object is corresponding to the second scene. S1301 may be replaced as follows: The mobile phone process the subsampled first image, to obtain a first mask image of the first shot object and a second mask image of the second shot object.

It may be understood that the obtained first mask image and the obtained second mask image (referred to as subsampled mask images) after the mobile phone processes the subsampled first image are thumbnails (referred to as m mask images before subsampling) of the mask images of the first image obtained by the mobile phone before performing S1301. The mobile phone performs S304 to process the first image before subsampling to obtain the second image and the third image. Therefore, a size of the second image and a size of the third image obtained by the mobile phone performing S304 do not match sizes of subsampled mask images. The size of the second image and the size of the third image are respectively larger than sizes of the subsampled mask images. In this way, when the mobile phone performs S1302, it is difficult for the mobile phone to perform image composition on the second image and the third image based on the first mask image and the second mask image.

Based on this, in this embodiment of this application, before step S1302: performing image composition on the second image and the third image based on the first mask image and the second mask image, to obtain the fourth image, the mobile phone may further upsample the first mask image and the second mask image. For example, before S1302, the method in this embodiment of this application may further include: The mobile phone respectively performs ratio-based upsampling on the first mask image at a second preset ratio, to obtain an upsampled first mask image; and the mobile phone respectively performs ratio-based upsampling on the second mask image at a second preset ratio, to obtain an upsampled second mask image. Then the mobile phone may compose the second image and the third image based on the upsampled first mask image and the upsampled second mask image, to obtain the fourth image.

The upsampling (upsampling) may also be referred to as image interpolating (interpolating). A mask image is upsampled, so that the mask image may be amplified. For example, a quantity of pixels of the mask image before upsampling may be 2,000*1,500, and a quantity of pixels of an upsampled mask image may be 4,000*3,000.

It should be understood that the "upsampling" described in this embodiment of this application is ratio-based upsampling. In this way, a situation in which a mask image after upsampling is warped compared with the mask image before upsampling may be prevented.

To ensure that a size of a mask image after upsampling is the same as a size of the second image and a size of the third image, the second preset ratio and the first preset ratio may be reciprocal.

For example, based on FIG. 12, in the following embodiment, in this embodiment of this application, with reference to FIG. 16, the method in this embodiment is described.

Figure 16:
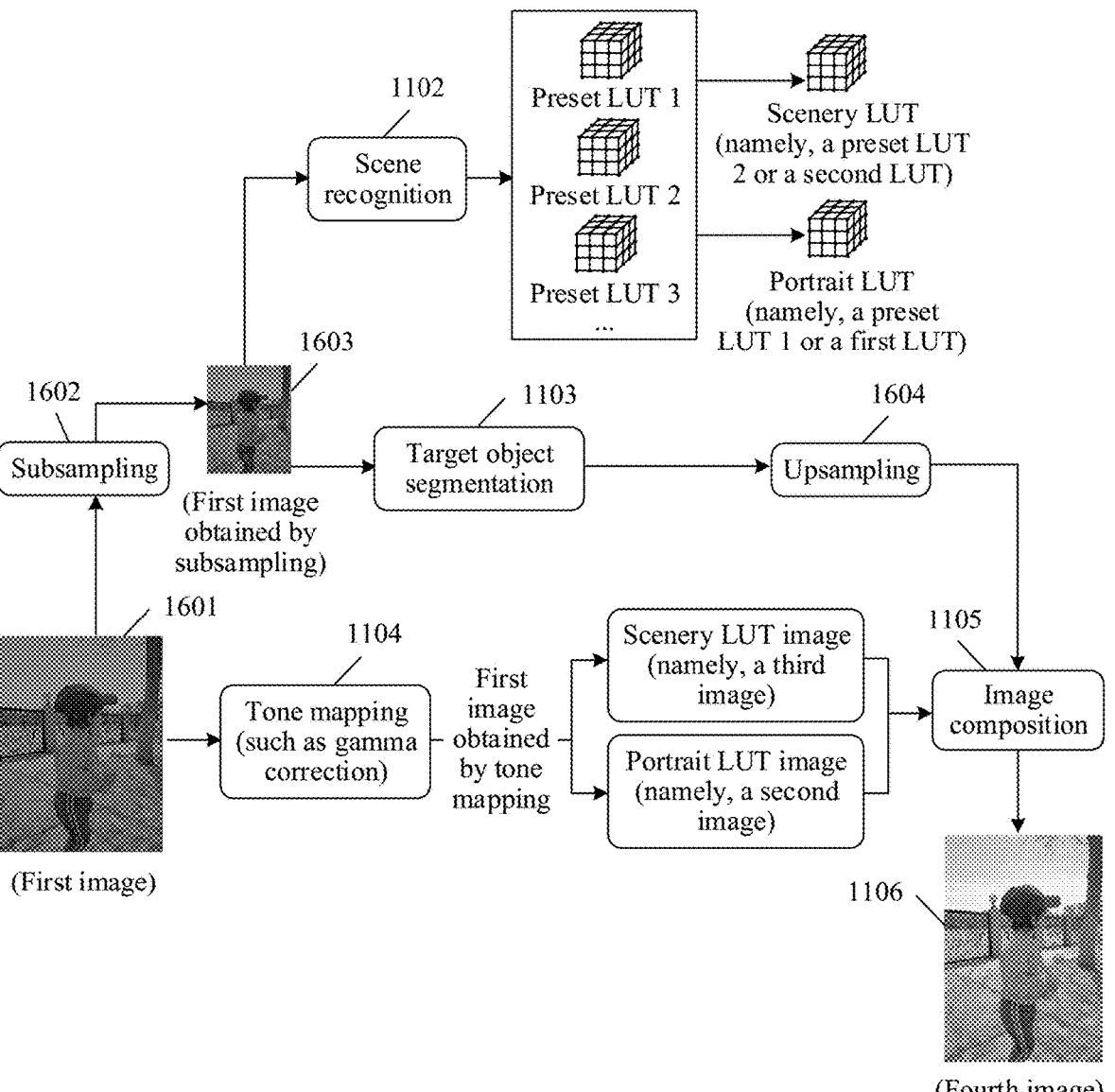
FIG. 16 is a schematic diagram of a principle of another image composition according to an embodiment of this application.

The mobile phone may perform S301 to obtain a first image 1601 shown in FIG. 16. Afterwards, the mobile phone may subsample 1602 the first image 1601 shown in FIG. 16, to obtain a subsampled first image 1603 shown in FIG. 16. Then the mobile phone may perform scene recognition 1102 shown in FIG. 16 on the subsampled first image 1603, and recognize that a shooting scene corresponding to the subsampled first image 1603 includes a portrait scene (namely, a first scene) and a scenery scene (namely, a second scene). As shown in FIG. 16, the mobile phone may select a preset LUT 3 (such as a portrait LUT, namely, a first LUT) for the portrait scene and a preset LUT 2 (such as a background LUT, namely, a second LUT) for the scenery scene from a plurality of preset LUTs such as a preset LUT 1, a preset LUT 2 (namely, a scenery LUT), and a preset LUT 3 (namely a portrait LUT).

The mobile phone may perform tone mapping (such as gamma correction) 1104 on the first image 1601 shown in FIG. 16, to obtain a first image on which tone mapping is performed. Afterwards, the mobile phone may use the portrait LUT shown in FIG. 16 to process a first image obtained on which tone mapping is performed, to obtain the portrait LUT image (namely, the second image) shown in FIG. 16. The mobile phone may use the scenery LUT shown in FIG. 16 to process a first image obtained on which tone mapping is performed, to obtain a scenery LUT image (namely, the third image) shown in FIG. 16.

The mobile phone may further perform target object segmentation 1103 shown in FIG. 16, and obtain a mask image of a target object from the subsampled first image 1603 by segmentation. For example, the mobile phone may obtain a first mask image (such as a portrait) of a first shot object and a second mask image (such as a scenery) of a second shot object by segmentation.

As shown in FIG. 16, the mobile phone may upsample 1604 a mask image obtained by segmentation, to obtain an upsampled mask image. Finally, the mobile phone may perform image composition 1105 on the third image and the second image based on the upsampled mask, to obtain a fourth image 1106. After comparison of the first image 1101 with the fourth image 1106, it may be learned that a display effect of a portrait in the fourth image 1106 is superior to a display effect of a portrait in the first image 1101.

It should be noted that shot objects included in the first image are not limited to two, and the method in this embodiment of this application is described by taking only the first image including the first shot object and the second shot object as an example. In the following embodiment, the method in this embodiment of this application is described by taking that the first image includes a shot object as an example.

For example, assuming that pre-configured shooting scenes in the mobile phone include a portrait scene, a sky scene, and a building scene, a plurality of preset LUTs such as a preset LUT 1 (such as the portrait LUT), a preset LUT 2 (such as the LUT), a preset LUT 3 (such as the sky LUT), a preset LUT 4, and a preset LUT 5 as shown in FIG. 16 are preconfigured in the mobile phone. In the following embodiment, the method in this embodiment of this application is introduced with reference to FIG. 17.

Figure 17:
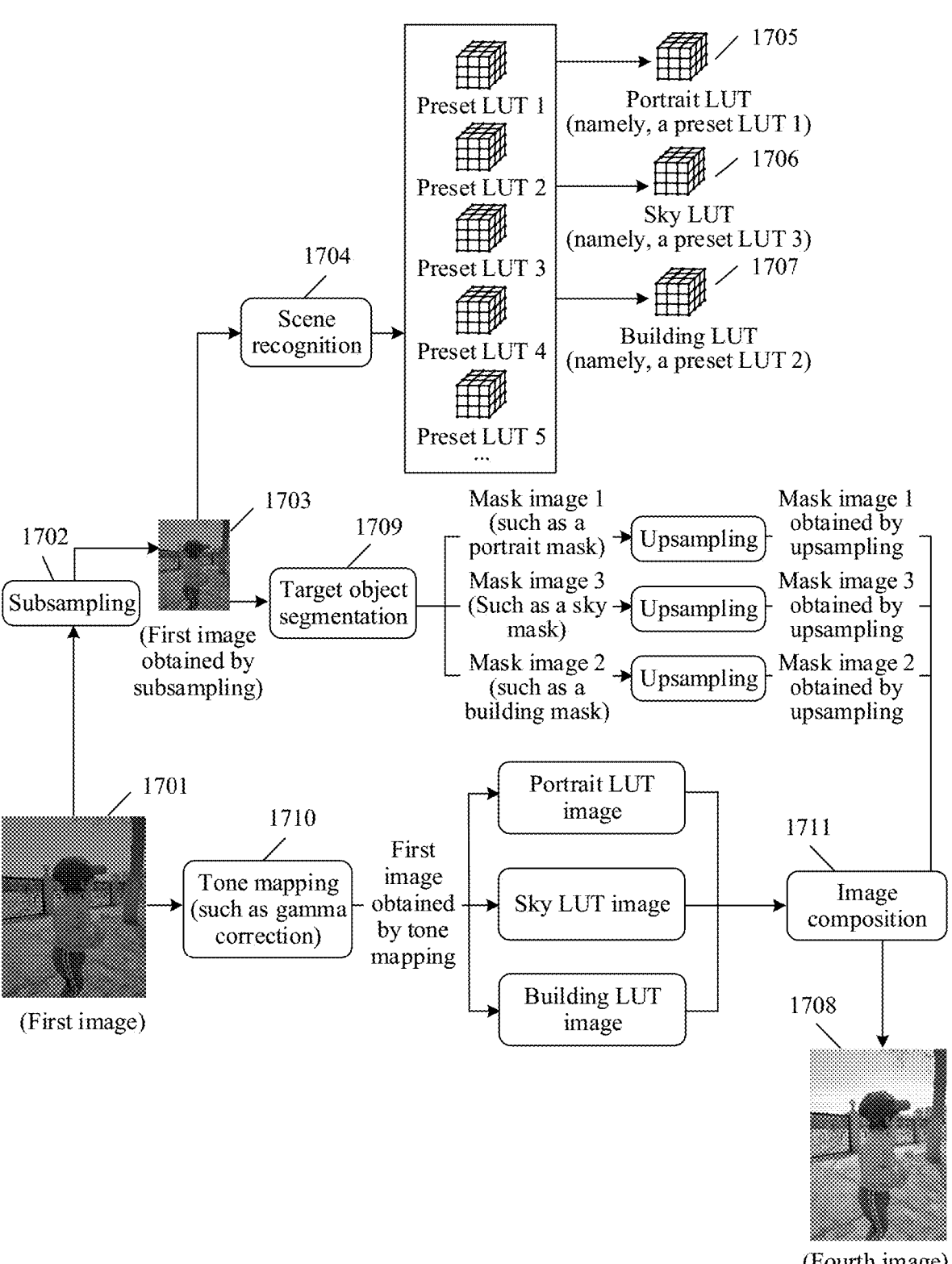
FIG. 17 is a schematic diagram of a principle of another image processing method according to an embodiment of this application.

The mobile phone may obtain a first image 1701 shown in FIG. 17. Afterwards, the mobile phone may subsample 1702 the first image 1701 shown in FIG. 17, to obtain a subsampled first image 1703 shown in FIG. 17. Then the mobile phone may perform scene recognition 1704 shown in FIG. 17 on a subsampled first image 1703, and recognize that a shooting scene corresponding to the subsampled first image 1703 includes a portrait scene, a sky scene, and a building scene. As shown in FIG. 17, the mobile phone may select a preset LUT 1 (such as a portrait LUT) 1705 of the portrait scene, a preset LUT 3 (such as a sky LUT) 1706, and a preset LUT 2 (such as a building LUT) 1707 from a plurality of preset LUTs such as a preset LUT 1, a preset LUT 2, a preset LUT 3, a preset LUT 4, and a preset LUT 5.

It may be understood that scene recognition may be performed on the first image 1701 without upsampling and subsampling. This applies to another embodiment.

The mobile phone may perform tone mapping (such as gamma correction) 1710 on the first image 1701 shown in FIG. 17, to obtain a first image on which tone mapping is performed. Then the mobile phone may use the portrait LUT 1705 shown in FIG. 17 to process an image obtained on which tone mapping is performed, to obtain a portrait LUT image shown in FIG. 17. The mobile phone may use the sky LUT 1706 shown in FIG. 17 to process an image obtained on which tone mapping is performed, to obtain a sky LUT image shown in FIG. 17. The mobile phone may perform S305, and use the building LUT 1707 shown in FIG. 17 to process an image obtained on which tone mapping is performed, to obtain a building LUT image shown in FIG. 17.

The mobile phone may further perform target object segmentation 1709 shown in FIG. 17, and obtain a mask image of a target object from the subsampled first image 1703 by segmentation. For example, the mobile phone may obtain a mask image 1 (such as a portrait mask image), a mask image 2 (such as a building mask image), and a mask image 3 (such as a sky mask image) by segmentation.

As shown in FIG. 17, the mobile phone may upsample the mask image 1 (such as a portrait mask) to obtain an upsampled mask image 1; upsample the mask image 3 (such as a sky mask) to obtain an upsampled mask image 3; and upsample a mask image 2 (such as a sky mask) to obtain an upsampled mask image 2. Finally, the mobile phone may perform image composition 1711 on the portrait LUT image, the sky LUT image, and the building LUT image based on the mask image 1, the mask image 3, and the mask image 2, to obtain a fourth image 1708. After comparison of the first image 1701 with the fourth image 1708, it may be learned that a display effect of a portrait in the fourth image 1708 is superior to a display effect of a portrait in the first image 1701.

It may be understood that, optionally, when the first image includes a first shot object (such as a portrait), a second shot object (such as a building), and a background object (such as a sky, including all other objects except the first shot object and the second shot object), the mobile phone may obtain a portrait mask and a building mask without obtaining a sky mask. An image may be composed based on the portrait LUT image and the portrait mask, the building LUT image and the building mask, and the sky LUT image.

It may be understood that composition in this embodiment of this application may be fusion, and fusion of images is implemented by using a fusion algorithm in conventional technologies. Details are not described herein.

Some other embodiments of this application provide an electronic device. The electronic device may include: a memory, a display, one or more camera lens, and one or more processors.

The memory, the display, and the camera lens are coupled to the processor. The memory stores computer program code, and the computer program code includes computer instructions. When the computer instructions are executed by the processor, the electronic device is enabled to perform functions or steps performed by the mobile phone in the foregoing method embodiments. For a structure of the electronic device, refer to the structure of the electronic device 100 shown in FIG. 2.

Figure 18:
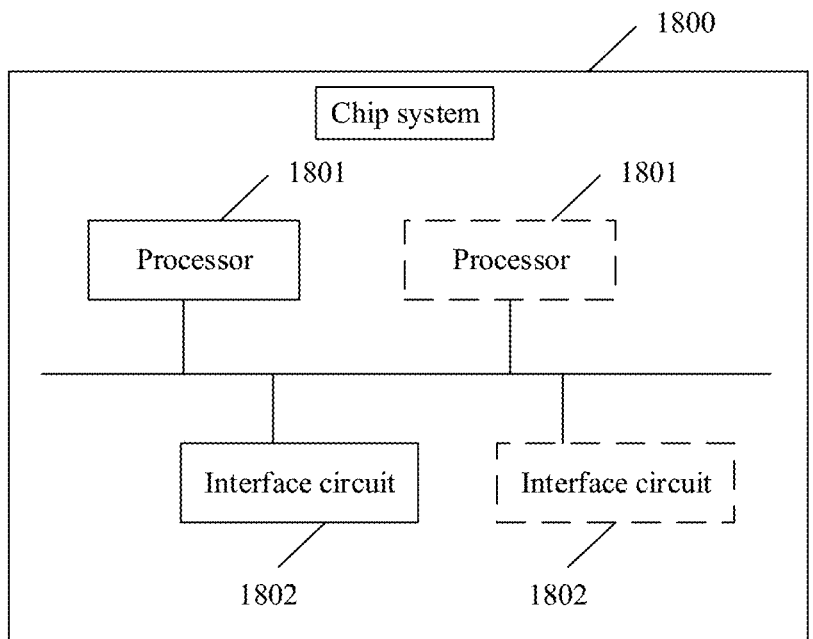
FIG. 18 is a schematic diagram of a structure of a chip system according to an embodiment of this application.

An embodiment of this application further provides a chip system. As shown in FIG. 18, the chip system 1800 includes at least one processor 1801 and at least one interface circuit 1802.

The processor 1801 and the interface circuit 1802 may be interconnected by lines. For example, the interface circuit 1802 may be configured to receive a signal from another apparatus (for example, a memory of an electronic device). For another example, the interface circuit 1802 may be configured to transmit a signal to another apparatus (for example, the processor 1801). For example, the interface circuit 1802 may read instructions stored in the memory, and send the instructions to the processor 1801. When the instructions are executed by the processor 1801, the electronic device is enabled to perform the steps performed by the mobile phone in the foregoing embodiments. Of course, the chip system may further include another discrete component. This is not specifically limited in this embodiment of this application.

An embodiment of this application further provides a computer storage medium. The computer storage medium includes computer instructions. When the computer instructions are run on the foregoing electronic device, the electronic device is enabled to execute the functions or steps that are performed by the mobile phone in the foregoing method embodiments.

An embodiment of this application further provides a computer program product. When the computer program product is run on a computer, the computer is enabled to perform functions or steps performed by the mobile phone in the foregoing method embodiment. For example, the computer may be the mobile phone.

The foregoing descriptions about implementations allow a person skilled in the art to clearly understand that, for convenient and brief description, division of the foregoing functional modules is taken as an example for illustration. In actual application, the foregoing functions may be allocated to different functional modules and implemented based on a requirement, that is, an inner structure of an apparatus is divided into different functional modules to implement all or some of the foregoing functions.

In the several embodiments provided in this application, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate parts may or may not be physically separate, and parts displayed as units may be one or more physical units, may be located in one place or may be distributed in different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such understanding, the technical solutions in embodiments of this application essentially, the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a mobile hard disk, a read only memory (ROM), a random access memory (RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method, wherein the method comprises:

obtaining, by an electronic device, a first image, wherein the first image is an image captured by a camera lens of the electronic device, and the first image comprises a first shot object and a second shot object;

determining, by the electronic device, that the first shot object is corresponding to a first scene and the second shot object is corresponding to a second scene, wherein the first scene is used to recognize a first shooting scene category corresponding to the first shot object, the second scene is used to recognize a second shooting scene category corresponding to the second shot object, and the first shooting scene category and the second shooting scene category are selected from a plurality of pre-configured object categories;

determining, by the electronic device, a first look up table (LUT) based on the first scene and a second LUT based on the second scene, wherein the second LUT is different from the first LUT, the first LUT and the second LUT are color mapping tables for color adjustment of a pixel, the first LUT and the second LUT are selected from a plurality of pre-configured LUTs based on a one-to-one mapping relationship between the plurality of pre-configured LUTs and the plurality of pre-configured object categories, and each of the plurality of pre-configured LUTs is associated with a respective display effect and converts input RGB color values to output RGB color values;

processing, by the electronic device, the first image based on the first LUT to obtain a second image, and processing, by the electronic device, the first image based on the second LUT to obtain a third image, wherein a display effect of the second image is corresponding to the first LUT, and a display effect of the third image is corresponding to the second LUT;

obtaining, by the electronic device, a first mask image of the first shot object and a second mask image of the second shot object based on the first image;

performing, by the electronic device, image composition on the second image and the third image based on the first mask image and the second mask image, to obtain a fourth image; and displaying, by the electronic device, the fourth image, wherein the fourth image comprises a part of the second image and a part of the third image, wherein the part of the second image is an image corresponding to the first mask image in the second image; and the part of the third image is an image corresponding to the second mask image in the third image, and wherein the part of the second image comprises the first shot object, a display effect of the part of the second image is corresponding to the first LUT, the part of the third image comprises the second shot object, and a display effect of the part of the third image is corresponding to the second LUT.

2. The method according to claim 1, wherein the method further comprises:

performing, by the electronic device, tone mapping on the first image to obtain a first image on which tone mapping is performed; and the processing, by the electronic device, the first image based on the first LUT to obtain a second image, and processing, by the electronic device, the first image based on the second LUT to obtain a third image comprises:

processing, by the electronic device, the first image on which tone mapping is performed based on the first LUT to obtain the second image, and processing, by the electronic device, the first image on which tone mapping is performed based on the second LUT to obtain the third image.

3. The method according to claim 2, wherein the performing, by the electronic device, tone mapping on the first image to obtain a first image on which tone mapping is performed comprises:

performing, by the electronic device, tone mapping on the first image by using a gamma curve, to obtain the first image on which tone mapping is performed.

4. The method according to claim 3, wherein before the performing, by the electronic device, tone mapping on the first image by using a gamma curve, to obtain the first image on which tone mapping is performed, the method further comprises:

normalizing, by the electronic device, luminance values of pixels in the first image, to obtain a normalized first image, wherein the electronic device performs tone mapping on the normalized first image by using the gamma curve, to obtain a second image on which tone mapping is performed.

5. The method according to claim 1, wherein before the determining, by the electronic device, that the first shot object is corresponding to a first scene and the second shot object is corresponding to a second scene, the method further comprises:

performing ratio-based subsampling, by the electronic device, on the first image at a first preset ratio, to obtain a subsampled first image, wherein the electronic device recognizes the subsampled first image and determines that the first shot object is corresponding to the first scene and the second shot object is corresponding to the second scene; and the electronic device processes the subsampled first image, to obtain the first mask image of the first shot object and the second mask image of the second shot object.

6. The method according to claim 5, wherein before the performing, by the electronic device, image composition on the second image and the third image based on the first mask image and the second mask image, to obtain the fourth image, the method further comprises:

performing ratio-based upsampling, by the electronic device, on the first mask image and the second mask image at a second preset ratio respectively, to obtain an upsampled first mask image and an upsampled second mask image, wherein the electronic device performs image composition on the second image and the third image based on the upsampled first mask image and the upsampled second mask image, to obtain the fourth image.

7. The method according to claim 5, wherein the performing, by the electronic device, image composition on the second image and the third image based on the first mask image and the second mask image, to obtain the fourth image comprises:

determining, by the electronic device, a first mask region from the second image based on the first mask image, and determining, by the electronic device, a second mask region from the third image based on the second mask image; and composing, by the electronic device, an image in the first mask region and an image in the second mask region, to obtain the fourth image.

8. The method according to claim 7, wherein the composing, by the electronic device, an image in the first mask region and an image in the second mask region, to obtain the fourth image comprises:

feathering, by the electronic device, an edge region of the image in the first mask region and an edge region of the image in the second mask region, to obtain an image on which feathering is performed in the first mask region and an image on which feathering is performed in the second mask region; and composing, by the electronic device, the image on which feathering is performed in the first mask region and the image on which feathering is performed in the second mask region, to obtain the fourth image.

9. An electronic device, wherein the electronic device comprises a memory, a display, one or more camera lenses, and one or more processors; and the memory, the display, and the one or more camera lenses are coupled to the one or more processors, wherein the memory stores computer program code, the computer program code comprises computer instructions, and when the computer instructions are executed by the one or more processors, the electronic device is enabled to perform operations comprising:

obtaining a first image, wherein the first image is an image captured by the one or more camera lenses, and the first image comprises a first shot object and a second shot object;

determining that the first shot object is corresponding to a first scene and the second shot object is corresponding to a second scene, wherein the first scene is used to recognize a first shooting scene category corresponding to the first shot object, the second scene is used to recognize a second shooting scene category corresponding to the second shot object, and the first shooting scene category and the second shooting scene category are selected from a plurality of pre-configured object categories;

determining a first look up table (LUT) based on the first scene and a second LUT based on the second scene, wherein the second LUT is different from the first LUT, the first LUT and the second LUT are color mapping tables for color adjustment of a pixel, the first LUT and the second LUT are selected from a plurality of pre-configured LUTs based on a one-to-one mapping relationship between the plurality of pre-configured LUTs and the plurality of pre-configured object categories, and each of the plurality of pre-configured LUTs is associated with a respective display effect and converts input RGB color values to output RGB color values;

processing the first image based on the first LUT to obtain a second image, and processing, by the electronic device, the first image based on the second LUT to obtain a third image, wherein a display effect of the second image is corresponding to the first LUT, and a display effect of the third image is corresponding to the second LUT;

obtaining a first mask image of the first shot object and a second mask image of the second shot object based on the first image;

performing image composition on the second image and the third image based on the first mask image and the second mask image, to obtain a fourth image; and displaying the fourth image, wherein the fourth image comprises a part of the second image and a part of the third image, wherein the part of the second image is an image corresponding to the first mask image in the second image; and the part of the third image is an image corresponding to the second mask image in the third image, and wherein the part of the second image comprises the first shot object, a display effect of the part of the second image is corresponding to the first LUT, the part of the third image comprises the second shot object, and a display effect of the part of the third image is corresponding to the second LUT.

10. The electronic device according to claim 9, wherein the operations further comprise:

performing, by the electronic device, tone mapping on the first image to obtain a first image on which tone mapping is performed; and the processing, by the electronic device, the first image based on the first LUT to obtain a second image, and processing, by the electronic device, the first image based on the second LUT to obtain a third image comprises:

processing, by the electronic device, the first image on which tone mapping is performed based on the first LUT to obtain the second image, and processing, by the electronic device, the first image on which tone mapping is performed based on the second LUT to obtain the third image.

11. The electronic device according to claim 10, wherein the performing, by the electronic device, tone mapping on the first image to obtain a first image on which tone mapping is performed comprises:

performing, by the electronic device, tone mapping on the first image by using a gamma curve, to obtain the first image on which tone mapping is performed.

12. The electronic device according to claim 11, wherein before the performing, by the electronic device, tone mapping on the first image by using a gamma curve, to obtain the first image on which tone mapping is performed, the operations further comprise:

normalizing, by the electronic device, luminance values of pixels in the first image, to obtain a normalized first image, wherein the electronic device performs tone mapping on the normalized first image by using the gamma curve, to obtain a second image on which tone mapping is performed.

13. A non-transitory computer-readable storage medium, comprising computer instructions, wherein when the computer instructions are run on an electronic device, the electronic device is enabled to perform operations comprising:

obtaining a first image, wherein the first image is an image captured by one or more camera lenses, and the first image comprises a first shot object and a second shot object;

determining that the first shot object is corresponding to a first scene and the second shot object is corresponding to a second scene, wherein the first scene is used to recognize a first shooting scene category corresponding to the first shot object, and the second scene is used to recognize a second shooting scene category corresponding to the second shot object, and the first shooting scene category and the second shooting scene category are selected from a plurality of pre-configured object categories;

determining a first look up table (LUT) based on the first scene and a second LUT based on the second scene, wherein the second LUT is different from the first LUT, the first LUT and the second LUT are color mapping tables for color adjustment of a pixel, the first LUT and the second LUT are selected from a plurality of pre-configured LUTs based on a one-to-one mapping relationship between the plurality of pre-configured LUTs and the plurality of pre-configured object categories, and each of the plurality of pre-configured LUTs is associated with a respective display effect and converts input RGB color values to output RGB color values;

processing the first image based on the first LUT to obtain a second image, and processing, by the electronic device, the first image based on the second LUT to obtain a third image, wherein a display effect of the second image is corresponding to the first LUT, and a display effect of the third image is corresponding to the second LUT;

obtaining a first mask image of the first shot object and a second mask image of the second shot object based on the first image;

performing image composition on the second image and the third image based on the first mask image and the second mask image, to obtain a fourth image; and displaying the fourth image, wherein the fourth image comprises a part of the second image and a part of the third image, wherein the part of the second image is an image corresponding to the first mask image in the second image; and the part of the third image is an image corresponding to the second mask image in the third image, and wherein the part of the second image comprises the first shot object, a display effect of the part of the second image is corresponding to the first LUT, the part of the third image comprises the second shot object, and a display effect of the part of the third image is corresponding to the second LUT.

14. The non-transitory computer-readable storage medium according to claim 13, wherein the operations further comprise:

performing, by the electronic device, tone mapping on the first image to obtain a first image on which tone mapping is performed; and the processing, by the electronic device, the first image based on the first LUT to obtain a second image, and processing, by the electronic device, the first image based on the second LUT to obtain a third image comprises:

processing, by the electronic device, the first image on which tone mapping is performed based on the first LUT to obtain the second image, and processing, by the electronic device, the first image on which tone mapping is performed based on the second LUT to obtain the third image.

15. The non-transitory computer-readable storage medium according to claim 14, wherein the performing, by the electronic device, tone mapping on the first image to obtain a first image on which tone mapping is performed comprises:

performing, by the electronic device, tone mapping on the first image by using a gamma curve, to obtain the first image on which tone mapping is performed.

16. The non-transitory computer-readable storage medium according to claim 15, wherein before the performing, by the electronic device, tone mapping on the first image by using a gamma curve, to obtain the first image on which tone mapping is performed, the operations further comprise:

normalizing, by the electronic device, luminance values of pixels in the first image, to obtain a normalized first image, wherein the electronic device performs tone mapping on the normalized first image by using the gamma curve, to obtain a second image on which tone mapping is performed.

17. The non-transitory computer-readable storage medium according to claim 13, wherein before the determining, by the electronic device, that the first shot object is corresponding to a first scene and the second shot object is corresponding to a second scene, the operations further comprise:

performing ratio-based subsampling, by the electronic device, on the first image at a first preset ratio, to obtain a subsampled first image, wherein the electronic device recognizes the subsampled first image and determines that the first shot object is corresponding to the first scene and the second shot object is corresponding to the second scene; and the electronic device processes the subsampled first image, to obtain the first mask image of the first shot object and the second mask image of the second shot object.

18. The non-transitory computer-readable storage medium according to claim 17, wherein before the performing, by the electronic device, image composition on the second image and the third image based on the first mask image and the second mask image, to obtain the fourth image, the operations further comprise:

performing ratio-based upsampling, by the electronic device, on the first mask image and the second mask image at a second preset ratio respectively, to obtain an upsampled first mask image and an upsampled second mask image, wherein the electronic device performs image composition on the second image and the third image based on the upsampled first mask image and the upsampled second mask image, to obtain the fourth image.

19. The non-transitory computer-readable storage medium according to claim 17, wherein the performing, by the electronic device, image composition on the second image and the third image based on the first mask image and the second mask image, to obtain the fourth image comprises:

determining, by the electronic device, a first mask region from the second image based on the first mask image, and determining, by the electronic device, a second mask region from the third image based on the second mask image; and composing, by the electronic device, an image in the first mask region and an image in the second mask region, to obtain the fourth image.

20. The non-transitory computer-readable storage medium according to claim 19, wherein the composing, by the electronic device, an image in the first mask region and an image in the second mask region, to obtain the fourth image comprises:

feathering, by the electronic device, an edge region of the image in the first mask region and an edge region of the image in the second mask region, to obtain an image on which feathering is performed in the first mask region and an image on which feathering is performed in the second mask region; and composing, by the electronic device, the image on which feathering is performed in the first mask region and the image on which feathering is performed in the second mask region, to obtain the fourth image.

* * * * *